(12) United States Patent
McKee et al.

(10) Patent No.: US 7,827,561 B2
(45) Date of Patent: Nov. 2, 2010

(54) SYSTEM AND METHOD FOR PUBLIC CONSUMPTION OF COMMUNICATION EVENTS BETWEEN ARBITRARY PROCESSES

(75) Inventors: Timothy P. McKee, Seattle, WA (US); Michael P. Arcuri, Seattle, WA (US); Chaitanya D. Sareen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1411 days.

(21) Appl. No.: 10/809,249

(22) Filed: Mar. 25, 2004

(65) Prior Publication Data

US 2004/0194116 A1   Sep. 30, 2004

Related U.S. Application Data

(63) Continuation-in-part of application No. 10/692,324, filed on Oct. 23, 2003, which is a continuation-in-part of application No. 10/402,075, filed on Mar. 26, 2003.

(51) Int. Cl.
G06F 3/00 (2006.01)
G06F 9/44 (2006.01)
G06F 9/46 (2006.01)
G06F 13/00 (2006.01)
G06F 15/16 (2006.01)

(52) U.S. Cl. .................... 719/313; 719/318; 709/206; 709/207

(58) Field of Classification Search .............. 719/318, 719/313; 709/204, 206–207; 706/45–47
See application file for complete search history.

(56) References Cited

U.S. PATENT DOCUMENTS 5,241,671 A    8/1993    Reed et al.

(Continued)

FOREIGN PATENT DOCUMENTS

CN    1421800    6/2003

(Continued)

OTHER PUBLICATIONS

"About Managing Messages With Rules," Microsoft® Outlook® 2003 Help file.

(Continued)

*Primary Examiner*—Qing-Yuan Wu
(74) *Attorney, Agent, or Firm*—Shook, Hardy & Bacon L.L.P

(57) ABSTRACT

A system and method for public consumption of communication events between arbitrary processes. In one embodiment, mechanisms are provided by which the system can effectively act to broker a user's communications and thus act as a type of automated assistant. The invention is provided in a notification user context system which determines when it is appropriate or not appropriate to interrupt a user with a notification based on the user's context (i.e., availability to interruption). The system provides for processes to be informed when these notification events are occurring, thus allowing the processes to act on these types of events on the user's behalf. In one example embodiment, a calendaring program may be a type of process that is registered to be informed when communication events occur. When the calendaring program is informed that a notification from another program (e.g., e-mail, instant messaging, etc.) has been refused due to the user being busy, the calendaring program may evaluate the sender, and if appropriate respond with a customized busy announcement that indicates a time when the user may next be available.

31 Claims, 33 Drawing Sheets

U.S. PATENT DOCUMENTS

| | | | |
|---|---|---|---|
| 5,333,315 A | 7/1994 | Saether et al. | |
| 5,388,196 A | 2/1995 | Pajak | |
| 5,428,784 A * | 6/1995 | Cahill, Jr. | ............... 709/206 |
| 5,461,710 A | 10/1995 | Bloomfield et al. | |
| 5,493,692 A | 2/1996 | Theimer et al. | |
| 5,499,364 A | 3/1996 | Klein et al. | |
| 5,504,852 A | 4/1996 | Thompson-Rohrlich | |
| 5,513,306 A | 4/1996 | Mills et al. | |
| 5,559,948 A | 9/1996 | Bloomfield | |
| 5,598,524 A | 1/1997 | Johnston, Jr. et al. | |
| 5,630,042 A | 5/1997 | McIntosh et al. | |
| 5,680,563 A | 10/1997 | Edelman | |
| 5,696,486 A | 12/1997 | Poliquin et al. | |
| 5,757,925 A | 5/1998 | Faybishenko | |
| 5,790,121 A | 8/1998 | Sklar et al. | |
| 5,802,516 A | 9/1998 | Shwarts et al. | |
| 5,828,882 A * | 10/1998 | Hinckley | ............... 719/318 |
| 5,831,606 A | 11/1998 | Nakajima et al. | |
| 5,835,094 A | 11/1998 | Ermel et al. | |
| 5,838,317 A | 11/1998 | Bolnick et al. | |
| 5,838,322 A | 11/1998 | Nakajima et al. | |
| 5,867,163 A | 2/1999 | Kurtenbach | |
| 5,875,446 A | 2/1999 | Brown et al. | |
| 5,878,410 A | 3/1999 | Zbikowski et al. | |
| 5,899,995 A | 5/1999 | Millier et al. | |
| 5,923,328 A | 7/1999 | Griesmer | |
| 5,929,854 A | 7/1999 | Ross | |
| 5,933,139 A | 8/1999 | Feigner et al. | |
| 5,935,210 A | 8/1999 | Stark | |
| 5,987,454 A | 11/1999 | Hobbs | |
| 5,987,506 A | 11/1999 | Carter et al. | |
| 6,003,040 A | 12/1999 | Mital et al. | |
| 6,008,806 A | 12/1999 | Nakajima et al. | |
| 6,014,137 A | 1/2000 | Burns | |
| 6,021,262 A | 2/2000 | Cote et al. | |
| 6,023,708 A | 2/2000 | Mendez et al. | |
| 6,025,843 A | 2/2000 | Sklar | |
| 6,037,944 A | 3/2000 | Hugh | |
| 6,061,692 A | 5/2000 | Thomas et al. | |
| 6,061,695 A | 5/2000 | Slivka et al. | |
| 6,078,924 A | 6/2000 | Ainsbury et al. | |
| 6,097,389 A | 8/2000 | Morris et al. | |
| 6,144,968 A | 11/2000 | Zellweger | |
| 6,147,601 A | 11/2000 | Sandelman et al. | |
| 6,175,859 B1 * | 1/2001 | Mohler | ............... 709/206 |
| 6,181,342 B1 | 1/2001 | Niblack | |
| 6,185,603 B1 | 2/2001 | Henderson et al. | |
| 6,202,061 B1 | 3/2001 | Khosla et al. | |
| 6,237,011 B1 | 5/2001 | Ferguson et al. | |
| 6,240,421 B1 | 5/2001 | Stolarz | |
| 6,243,094 B1 | 6/2001 | Sklar | |
| 6,243,724 B1 | 6/2001 | Mander et al. | |
| 6,246,411 B1 | 6/2001 | Strauss | |
| 6,256,031 B1 | 7/2001 | Meijer et al. | |
| 6,275,829 B1 | 8/2001 | Angiulo et al. | |
| 6,308,173 B1 | 10/2001 | Glasser et al. | |
| 6,317,142 B1 | 11/2001 | Decoste et al. | |
| 6,324,551 B1 | 11/2001 | Lamping et al. | |
| 6,339,767 B1 | 1/2002 | Rivette et al. | |
| 6,341,280 B1 | 1/2002 | Glass et al. | |
| 6,363,377 B1 | 3/2002 | Kravets et al. | |
| 6,363,400 B1 | 3/2002 | Chtchetkine et al. | |
| 6,401,097 B1 | 6/2002 | McCotter et al. | |
| 6,411,311 B1 | 6/2002 | Rich et al. | |
| 6,430,575 B1 | 8/2002 | Dourish et al. | |
| 6,437,807 B1 | 8/2002 | Berquist et al. | |
| 6,448,985 B1 | 9/2002 | McNally | |
| 6,453,311 B1 | 9/2002 | Powers, III | |
| 6,453,319 B1 | 9/2002 | Mattis et al. | |
| 6,466,238 B1 | 10/2002 | Berry et al. | |
| 6,466,932 B1 | 10/2002 | Dennis et al. | |
| 6,480,835 B1 | 11/2002 | Light | |
| 6,493,755 B1 | 12/2002 | Hansen | |
| 6,505,233 B1 | 1/2003 | Hanson et al. | |
| 6,513,038 B1 | 1/2003 | Hasegawa et al. | |
| 6,526,399 B1 | 2/2003 | Coulson et al. | |
| 6,535,229 B1 | 3/2003 | Kraft | |
| 6,535,230 B1 | 3/2003 | Celik | |
| 6,539,399 B1 | 3/2003 | Hazama et al. | |
| 6,549,217 B1 | 4/2003 | DeGreef et al. | |
| 6,549,916 B1 | 4/2003 | Sedlar | |
| 6,563,514 B1 | 5/2003 | Samar | |
| 6,573,906 B1 | 6/2003 | Harding et al. | |
| 6,573,907 B1 | 6/2003 | Madrane | |
| 6,583,799 B1 | 6/2003 | Manolis et al. | |
| 6,590,585 B1 | 7/2003 | Suzuki et al. | |
| 6,606,105 B1 | 8/2003 | Quartetti | |
| 6,613,101 B2 | 9/2003 | Mander et al. | |
| 6,628,309 B1 | 9/2003 | Dodson et al. | |
| 6,636,238 B1 | 10/2003 | Amir et al. | |
| 6,636,250 B1 | 10/2003 | Gasser | |
| 6,662,198 B2 | 12/2003 | Satyanarayanan et al. | |
| 6,684,222 B1 | 1/2004 | Cornelius et al. | |
| 6,735,623 B1 | 5/2004 | Prust | |
| 6,738,770 B2 | 5/2004 | Gorman | |
| 6,745,206 B2 | 6/2004 | Mandler et al. | |
| 6,754,829 B1 | 6/2004 | Butt et al. | |
| 6,768,999 B2 | 6/2004 | Prager et al. | |
| 6,762,776 B2 | 7/2004 | Huapaya | |
| 6,762,777 B2 | 7/2004 | Carroll | |
| 6,763,458 B1 | 7/2004 | Watanabe et al. | |
| 6,784,900 B1 | 8/2004 | Dobronsky et al. | |
| 6,795,094 B1 | 9/2004 | Watanabe et al. | |
| 6,801,919 B2 | 10/2004 | Hunt et al. | |
| 6,803,926 B1 | 10/2004 | Lamb et al. | |
| 6,816,863 B2 | 11/2004 | Bates et al. | |
| 6,823,344 B1 | 11/2004 | Isensee et al. | |
| 6,847,959 B1 | 1/2005 | Arrouye | |
| 6,853,391 B2 | 2/2005 | Bates et al. | |
| 6,865,568 B2 | 3/2005 | Chau | |
| 6,871,348 B1 | 3/2005 | Cooper | |
| 6,876,900 B2 | 4/2005 | Takeda et al. | |
| 6,876,996 B2 | 4/2005 | Czajkowski et al. | |
| 6,880,132 B2 | 4/2005 | Uemura | |
| 6,883,009 B2 | 4/2005 | Yoo | |
| 6,906,722 B2 | 6/2005 | Hrebejk et al. | |
| 6,922,709 B2 | 7/2005 | Goodman | |
| 6,938,207 B1 | 8/2005 | Haynes | |
| 6,944,647 B2 | 9/2005 | Shah et al. | |
| 6,947,959 B1 | 9/2005 | Gill | |
| 6,950,818 B2 | 9/2005 | Dennis et al. | |
| 6,952,724 B2 | 10/2005 | Prust | |
| 6,980,993 B2 * | 12/2005 | Horvitz et al. | ............... 707/102 |
| 6,988,128 B1 | 1/2006 | Alexander et al. | |
| 7,010,755 B2 | 3/2006 | Anderson et al. | |
| 7,034,691 B1 * | 4/2006 | Rapaport et al. | ......... 340/573.1 |
| 7,051,291 B2 | 5/2006 | Sciammarella et al. | |
| 7,068,291 B1 | 6/2006 | Roberts et al. | |
| 7,139,811 B2 | 11/2006 | Ran et al. | |
| 7,203,948 B2 | 4/2007 | Mukundan et al. | |
| 7,272,660 B1 * | 9/2007 | Powers et al. | ............... 709/238 |
| 7,363,594 B1 | 4/2008 | Wright et al. | |
| 7,552,211 B2 | 6/2009 | Hansen et al. | |
| 2001/0034771 A1 | 10/2001 | Hutsch et al. | |
| 2001/0047368 A1 | 11/2001 | Oshinsky et al. | |
| 2001/0049675 A1 | 12/2001 | Mandler et al. | |
| 2001/0053996 A1 | 12/2001 | Atkinson | |
| 2001/0056434 A1 | 12/2001 | Kaplan et al. | |
| 2001/0056508 A1 | 12/2001 | Arneson et al. | |
| 2002/0019935 A1 | 2/2002 | Andrew et al. | |
| 2002/0033844 A1 | 3/2002 | Levy et al. | |
| 2002/0046232 A1 | 4/2002 | Adams et al. | |
| 2002/0046299 A1 | 4/2002 | Lefeber et al. | |
| 2002/0049717 A1 | 4/2002 | Routtenberg et al. | |

| Publication No. | Date | Name | | Publication No. | Date | Name |
|---|---|---|---|---|---|---|
| 2002/0052885 A1 | 5/2002 | Levy | | 2003/0158855 A1 | 8/2003 | Farnham et al. |
| 2002/0054167 A1 | 5/2002 | Hugh | | 2003/0177422 A1 | 9/2003 | Tararoukhine et al. |
| 2002/0059199 A1 | 5/2002 | Harvey | | 2003/0184587 A1 | 10/2003 | Ording et al. |
| 2002/0062310 A1 | 5/2002 | Marmor et al. | | 2003/0210281 A1 | 11/2003 | Ellis et al. |
| 2002/0075310 A1 | 6/2002 | Prabhu et al. | | 2003/0212680 A1 | 11/2003 | Bates et al. |
| 2002/0075312 A1 | 6/2002 | Amadio et al. | | 2003/0212710 A1 | 11/2003 | Guy |
| 2002/0075330 A1 | 6/2002 | Rosenzweig et al. | | 2003/0222915 A1 | 12/2003 | Marion et al. |
| 2002/0087649 A1 | 7/2002 | Horvitz | | 2003/0225796 A1 | 12/2003 | Matsubara |
| 2002/0087704 A1* | 7/2002 | Chesnais et al. ............ 709/228 | | 2003/0227487 A1 | 12/2003 | Hugh |
| 2002/0087740 A1 | 7/2002 | Castanho | | 2003/0229722 A1* | 12/2003 | Beyda ........................ 709/310 |
| 2002/0087969 A1 | 7/2002 | Brunheroto et al. | | 2003/0233419 A1 | 12/2003 | Beringer |
| 2002/0089540 A1 | 7/2002 | Geier et al. | | 2004/0001106 A1 | 1/2004 | Deutscher et al. |
| 2002/0091679 A1 | 7/2002 | Wright | | 2004/0002993 A1 | 1/2004 | Toussaint et al. |
| 2002/0091697 A1 | 7/2002 | Huang et al. | | 2004/0003247 A1 | 1/2004 | Fraser et al. |
| 2002/0091739 A1 | 7/2002 | Ferlitsch et al. | | 2004/0008226 A1 | 1/2004 | Manolis et al. |
| 2002/0095416 A1 | 7/2002 | Schwols | | 2004/0019584 A1 | 1/2004 | Greening et al. |
| 2002/0097278 A1 | 7/2002 | Mandler | | 2004/0019655 A1 | 1/2004 | Uemura et al. |
| 2002/0103998 A1 | 8/2002 | DeBruine | | 2004/0024635 A1* | 2/2004 | McClure et al. ................ 705/12 |
| 2002/0104069 A1 | 8/2002 | Gouge et al. | | 2004/0024784 A1 | 2/2004 | Spall et al. |
| 2002/0107973 A1 | 8/2002 | Lennon et al. | | 2004/0030731 A1 | 2/2004 | Iftode et al. |
| 2002/0111942 A1 | 8/2002 | Campbell et al. | | 2004/0044696 A1 | 3/2004 | Frost |
| 2002/0113821 A1 | 8/2002 | Hrebejk et al. | | 2004/0044776 A1 | 3/2004 | Larkin |
| 2002/0120505 A1 | 8/2002 | Henkin et al. | | 2004/0054674 A1 | 3/2004 | Carpenter et al. |
| 2002/0120757 A1 | 8/2002 | Sutherland et al. | | 2004/0056896 A1 | 3/2004 | Doblmayr et al. |
| 2002/0129033 A1 | 9/2002 | Hoxie et al. | | 2004/0068524 A1 | 4/2004 | Aboulhosn et al. |
| 2002/0138552 A1 | 9/2002 | DeBruine et al. | | 2004/0070612 A1 | 4/2004 | Sinclair et al. |
| 2002/0138582 A1 | 9/2002 | Chandra et al. | | 2004/0078256 A1* | 4/2004 | Glitho et al. .................... 705/8 |
| 2002/0138744 A1 | 9/2002 | Schleicher et al. | | 2004/0083433 A1 | 4/2004 | Takeya |
| 2002/0152262 A1 | 10/2002 | Arkin et al. | | 2004/0085581 A1 | 5/2004 | Tonkin |
| 2002/0152267 A1 | 10/2002 | Lennon | | 2004/0091175 A1 | 5/2004 | Beyrouti |
| 2002/0156895 A1 | 10/2002 | Brown | | 2004/0093290 A1* | 5/2004 | Doss et al. .................... 705/35 |
| 2002/0161800 A1 | 10/2002 | Eld et al. | | 2004/0098370 A1 | 5/2004 | Garland et al. |
| 2002/0163572 A1 | 11/2002 | Center, Jr. et al. | | 2004/0098379 A1 | 5/2004 | Huang |
| 2002/0169678 A1 | 11/2002 | Chao et al. | | 2004/0098742 A1 | 5/2004 | Hsieh et al. |
| 2002/0184357 A1 | 12/2002 | Traversat et al. | | 2004/0103280 A1 | 5/2004 | Balfanz et al. |
| 2002/0188605 A1 | 12/2002 | Adya et al. | | 2004/0117358 A1 | 6/2004 | von Kaenel et al. |
| 2002/0188735 A1 | 12/2002 | Needham et al. | | 2004/0128181 A1* | 7/2004 | Zurko et al. .................... 705/9 |
| 2002/0194252 A1 | 12/2002 | Powers, III | | 2004/0133572 A1 | 7/2004 | Bailey et al. |
| 2002/0196276 A1 | 12/2002 | Corl et al. | | 2004/0133588 A1 | 7/2004 | Kiessig et al. |
| 2002/0199061 A1 | 12/2002 | Friedman et al. | | 2004/0148434 A1 | 7/2004 | Matsubara et al. |
| 2003/0009484 A1 | 1/2003 | Hamanaka et al. | | 2004/0153451 A1 | 8/2004 | Phillips et al. |
| 2003/0014415 A1 | 1/2003 | Weiss et al. | | 2004/0153968 A1 | 8/2004 | Ching et al. |
| 2003/0014491 A1* | 1/2003 | Horvitz et al. .............. 709/206 | | 2004/0161080 A1* | 8/2004 | Digate et al. .............. 379/88.17 |
| 2003/0018657 A1 | 1/2003 | Monday | | 2004/0167942 A1 | 8/2004 | Oshinsky et al. |
| 2003/0018712 A1 | 1/2003 | Harrow et al. | | 2004/0177116 A1 | 9/2004 | McConn et al. |
| 2003/0028610 A1 | 2/2003 | Pearson | | 2004/0177148 A1 | 9/2004 | Tsimelzon, Jr. |
| 2003/0041178 A1 | 2/2003 | Brouk et al. | | 2004/0177319 A1 | 9/2004 | Horn |
| 2003/0046260 A1 | 3/2003 | Satyanarayanan et al. | | 2004/0183824 A1 | 9/2004 | Benson et al. |
| 2003/0058277 A1* | 3/2003 | Bowman-Amuah ......... 345/765 | | 2004/0189704 A1 | 9/2004 | Walsh et al. |
| 2003/0069893 A1 | 4/2003 | Kanai et al. | | 2004/0189707 A1 | 9/2004 | Moore et al. |
| 2003/0069980 A1 | 4/2003 | Picca et al. | | 2004/0192266 A1* | 9/2004 | Minabe .................... 455/414.1 |
| 2003/0074356 A1 | 4/2003 | Kaler | | 2004/0193594 A1 | 9/2004 | Moore |
| 2003/0078918 A1 | 4/2003 | Souvignier et al. | | 2004/0193600 A1 | 9/2004 | Kaasten et al. |
| 2003/0084150 A1 | 5/2003 | Hansen et al. | | 2004/0193621 A1 | 9/2004 | Moore et al. |
| 2003/0093321 A1 | 5/2003 | Bodmer et al. | | 2004/0193672 A1 | 9/2004 | Samji et al. |
| 2003/0093531 A1 | 5/2003 | Yeung et al. | | 2004/0193673 A1 | 9/2004 | Samji et al. |
| 2003/0093580 A1 | 5/2003 | Thomas et al. | | 2004/0199507 A1 | 10/2004 | Tawa, Jr. |
| 2003/0101200 A1 | 5/2003 | Koyama et al. | | 2004/0205168 A1 | 10/2004 | Asher |
| 2003/0105745 A1 | 6/2003 | Davidson et al. | | 2004/0205625 A1 | 10/2004 | Banatwala et al. |
| 2003/0110188 A1 | 6/2003 | Howard et al. | | 2004/0205633 A1 | 10/2004 | Martinez et al. |
| 2003/0115218 A1 | 6/2003 | Bobbitt et al. | | 2004/0205698 A1 | 10/2004 | Schliesmann et al. |
| 2003/0115488 A1* | 6/2003 | Kunito et al. ................ 713/201 | | 2004/0215600 A1 | 10/2004 | Aridor et al. |
| 2003/0117403 A1 | 6/2003 | Park et al. | | 2004/0220899 A1 | 11/2004 | Barney et al. |
| 2003/0120928 A1 | 6/2003 | Cato et al. | | 2004/0223057 A1 | 11/2004 | Oura et al. |
| 2003/0120952 A1 | 6/2003 | Tarbotton et al. | | 2004/0225650 A1 | 11/2004 | Cooper et al. |
| 2003/0122873 A1 | 7/2003 | Dieberger et al. | | 2004/0230572 A1 | 11/2004 | Omoigui |
| 2003/0126136 A1 | 7/2003 | Omoigui | | 2004/0230599 A1 | 11/2004 | Moore et al. |
| 2003/0126212 A1 | 7/2003 | Morris et al. | | 2004/0230917 A1 | 11/2004 | Bales et al. |
| 2003/0135495 A1 | 7/2003 | Vagnozzi | | 2004/0249902 A1 | 12/2004 | Tadayon et al. |
| 2003/0135517 A1 | 7/2003 | Kauffman | | 2005/0004928 A1 | 1/2005 | Hamer et al. |
| 2003/0135659 A1 | 7/2003 | Bellotti et al. | | 2005/0010860 A1 | 1/2005 | Weiss et al. |
| 2003/0140115 A1 | 7/2003 | Mehra | | 2005/0015405 A1 | 1/2005 | Plastina et al. |
| 2003/0154185 A1 | 8/2003 | Suzuki et al. | | 2005/0027757 A1 | 2/2005 | Kiessig et al. |

| | | | |
|---|---|---|---|
| 2005/0050470 | A1 | 3/2005 | Hudson et al. |
| 2005/0055306 | A1 | 3/2005 | Miller et al. |
| 2005/0080807 | A1 | 4/2005 | Beilison et al. |
| 2005/0097477 | A1 | 5/2005 | Camara et al. |
| 2005/0114672 | A1 | 5/2005 | Duncan et al. |
| 2005/0120242 | A1 | 6/2005 | Mayer et al. |
| 2005/0131903 | A1 | 6/2005 | Margolus et al. |
| 2005/0138108 | A1* | 6/2005 | Galvin et al. ............... 709/201 |
| 2005/0149481 | A1 | 7/2005 | Hesselink et al. |
| 2005/0166159 | A1 | 7/2005 | Mondry et al. |
| 2005/0171947 | A1 | 8/2005 | Gautestad |
| 2005/0192953 | A1 | 9/2005 | Neale et al. |
| 2005/0192966 | A1 | 9/2005 | Hilbert et al. |
| 2005/0243993 | A1 | 11/2005 | McKinzie et al. |
| 2005/0246331 | A1 | 11/2005 | DeVorchik et al. |
| 2005/0246643 | A1 | 11/2005 | Gusmorino et al. |
| 2005/0246664 | A1 | 11/2005 | Michelman et al. |
| 2005/0256909 | A1 | 11/2005 | Aboulhosn et al. |
| 2005/0257169 | A1 | 11/2005 | Tu |
| 2005/0283476 | A1 | 12/2005 | Kaasten et al. |
| 2006/0004692 | A1 | 1/2006 | Kaasten et al. |
| 2006/0020586 | A1 | 1/2006 | Prompt et al. |
| 2006/0036568 | A1 | 2/2006 | Moore et al. |
| 2006/0080308 | A1 | 4/2006 | Carpentier et al. |
| 2006/0129627 | A1 | 6/2006 | Phillips et al. |
| 2006/0173873 | A1 | 8/2006 | Prompt et al. |
| 2006/0200466 | A1 | 9/2006 | Kaasten et al. |
| 2006/0200832 | A1 | 9/2006 | Dutton |
| 2006/0218122 | A1 | 9/2006 | Poston |

FOREIGN PATENT DOCUMENTS

| | | |
|---|---|---|
| GB | 2329492 A | 3/1999 |
| WO | WO9938092 | 7/1999 |
| WO | WO0036493 | 6/2000 |
| WO | WO0109755 A2 | 2/2001 |
| WO | WO0163919 | 8/2001 |
| WO | WO0169387 | 9/2001 |
| WO | WO0225420 | 3/2002 |
| WO | WO2004107151 | 12/2004 |

OTHER PUBLICATIONS

"Trillian / Trillian Pro IM Clients" Product Description, © 1999-2004 Cerulean Studios, <http://www.ceruleanstudios.com> [retrieved Apr. 30, 2004].

Bertino, E., et al, "UCS-Router: A Policy Engine for Enforcing Message Routing Rules in a Universal Communications System," *Proceedings of the Third International Conference on Mobile Data Management*, Jan. 8-11, 2002, Singapore.

Blair, C., and G.E. Monahan, "Optimal Sequential File Search: A Reduced-State Dynamic Programming Approach," *European Journal of Operational Research* 86(2):358-365,1995.

Cöster, R., and M. Svensson, "Inverted File Search Algorithms for Collaborative Filtering," *Proceedings of the 25th Annual International ACM SIGIR Conference on Research and Development in Information Retrieval*, Tampere, Finland, Aug. 11-15, 2002.

Eklund, P., and R. Cole, "Structured Ontology and Information Retrieval for Email Search and Discovery," Proceedings of the Foundations of Intelligent Systems 13th International Symposium, Lyons, France, Jun. 27-29, 2002, pp. 75-84.

Gifford, D.K., et al., "Semantic File Systems," *Proceedings of the 13th ACM Symposium on Operating Systems Principles*, Pacific Grove, Calif., Sep. 1991, pp. 16-25.

Ho, I.S.K., and H.C.B. Chan, "A Markov Decision-Based Meeting Scheduling Mechanism for Automatic Secretary System Using Internet and Smart-Agent Technologies (Assist)," *Proceedings of the IEEE International Conference on Systems, Man and Cybernetics*, Washington, D.C., Oct. 5-8, 2003, vol. 5, pp. 4552-4559.

Lee, J.-J., and J. Lee, "An Adaptable Dialog Interface Agent Using Meta-Rules," *Proceedings of the Fourteenth International Florida Artificial Intelligence Research Society Conference*, May 21-23, 2001, Key West Florida.

Manber, U., and S. Wu, "Glimpse: A Tool to Search Through Entire File Systems," *Proceedings of USENIX Winter 1994 Conference*, San Francisco, Calif., Jan. 17-21, 1994.

Piernas, J., et al., "DualFS: A New Journaling File System Without Meta-Data Duplication," *Conference Proceedings of the 2002 International Conference on Supercomputing*, New York, Jun. 22-26, 2002, p. 137-46.

Rao, R., et al., "Rich Interaction in the Digital Library," *Communications of the ACM* 38(4):29-39, 1995.

Sankaranarayanan, A., and M. Matarić, "The Multi-Agent-Based Schedule Calculator (Masc) System," *Proceedings of the 2nd International Conference on Autonomous Agents*, Minneapolis, Minn., May 9-13, 1998, pp. 465-466.

Seltzer, M., et al., "Journaling Versus Soft Updates: Asynchronous Meta-data Protection in File Systems," *Proceedings of the 2000 USENIX Technical Conference*, San Diego, Calif., Jun. 18-23, 2000, pp. 71-84.

Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.

Weinreich, H., et al., "The Look of the Link—Concepts for the User Interface of Extended Hyperlinks," *Proceedings of the Twelfth ACM Conference on Hypertext and Hypermedia*, Aarhus, Denmark, Aug. 2001, pp. 19-28.

OA dated May 15, 2007 for U.S. Appl. No. 10/402,075, 14 pages.
OA dated Nov. 28, 2007 for U.S. Appl. No. 10/402,075, 14 pages.
OA dated Aug. 4, 2008 for U.S. Appl. No. 10/402,075, 14 pages.
OA dated Mar. 4, 2009 for U.S. Appl. No. 10/402,075, 15 pages.
OA dated Feb. 1, 2010 for U.S. Appl. No. 10/692,324, 14 pages.
OA dated Mar. 4, 2010 for U.S. Appl. No. 10/402,075, 20 pages.

Kuchinsky, et al., "FotoFile: A Consumer Multimedia Organization and Retrieval System," May 1999, ACM, pp. 496-503.

Written Opinion of SG 200301764-7 dated Jan. 11, 2007.

Windows Commander (website) <URL:http://www.shisler.com>, accessed using http://archive.org/web.php, in particular, http://web.archive.org/web/200302047145141/www.ghislercom/featurel.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.

Bott, et al., "Microsoft Windows XP Inside Out," Microsoft Press, 2001, Chapter 11, 39 pages.

Wikipedia, File Allocation Table, 2006, <http://en.wikipedia.org/wiki/File_Allocation_Tables>.

Bott, et al. Book titled "Special Edition Using Windows 98, Second Edition," Dec. 21, 1999, second edition, pp. 1-7.

Supplementary European Search Report for EP 04780390 dated Jun. 18, 2007.

Dey, A.K, "Providing Architectural Support for Building Context-Aware Applications," doctoral thesis, Georgia Institute of Technology, Nov. 2000, p. 24.

Microsoft Press Pass, "Window XP is Here!," New York, Oct. 25, 2001.

Microsoft, "Microsoft Windows XP Professional Product Documentation," section: (1) To Change how you view items in a folder, (2) Viewing files and folders overview, (4) To Change or remove a program, copyright 2006, publication date.

McFedries, Paul, "The Complete Idiot's Guide to Windows XP," Table of Contents, Oct. 3, 2001; Alpha Books, Chapter 8: A Tour of the My Pictures Folder - printed pp. 1-8, Chapter 11: Sights and Sounds: Music and Other Multimedia-printed pp. 1-3.

Stanek R. William, "Microsoft Windows XP Professional Administrator's Pocket Consultant," Sep. 24, 2001; Microsoft Press, Chapter 9, printed pp. 1-8.

Shah, Sarju, "Window XP Preview," FiringSquad, May 4, 2001, online, printed pp. 1-2; Figure: Hi-Res Image Viewer.

European Search Report for 03007909.9-2211 dated Jun. 30, 2006.

D. Esposito, "More Windows 2000 UI Goodies: Extending Explorer Views by Customizing Hypertext Template Files," MSDN Magazine.

<http://msdn.microsoft.com/msdnmag/issues/0600/w2kui2/default.aspx?print=true?, first date of publication unknown but no later than Jun. 2000, 15 pages.

Microsoft: "Microsoft Windows 2000 Professional Step by Step - Lesson 3 - Managing Files and Folders" <http://www.microsoft.com/mspress/books/sampshap/1589.asp>, Jan. 5, 2000, 12 pages.

Australian Search Report for SG 200301764-7 dated Mar. 30, 2006.

D. Esposito, Visual C++ Windows Shell Programming, Dec. 1, 1998, Apress. ISBN 1861001843, pp. 463-469.

P. DiLascia, "More Fun with MFC:DIBs, Palettes, Subclassing, and a Gamut of Goodies, Part III," Microsoft Systems Journal, Jun. 1997, 20 pages.

Australian Written Opinion for SG 200301764-7 dated Mar. 30, 2006.

Directory Opus 6.1 - Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.

Written Opinion of Singapore Application No. 2004032220-7 dated May 18, 2006.

McFedries, Paul; "The Complete Idiot's Guide to Windows XP," Table of Contents, Oct. 3, 2001; Alpha Books, Ch. 6: Using My Computer to Fiddle w/h Files and Folder-printed p. 1-6, Finding a File in Mess p. 103.

Langer, Maria, Mac OS X: Visual QuickStart Guide; Apr. 2001, Peachpit Press, Mac OS X Disc Organization (pp. 1-3), Views (pp. 1-11), Outlines (1-3).

Ray, Jay, Mac OS C Unleashed, Nov. 2001, Sams, Chapter 4. The Finder: Working with Filed and Applications (pp. 1-15), Getting File Information (pp. 1-7).

International Search Report and Written Opinion of PCT/US04/25931 dated Apr. 3, 2007.

Lee, J., "An End-User Perspective on File-Sharing Systems," Communications of the ACM 46(2):49-53, Feb. 2003.

Ohtani, A., et al., "A File Sharing Method for Storing Area Network and Its Performance Verification," NEC Res. & Develop. 44(1):85-90, Jan. 2003.

Microsoft Windows XP Version 2002 (Screen Dumps, Figs 1-16).

Simpson, Alan, Windows 95 Uncut, 1995, IDG Books Worldwide, Inc., pp. 104-10.

Feng, et al., "Schemata Transformation of Object-Oriented Conceptual Models to XML," Computer Systems Science & Engineering, vol. 18, No. 1, Jan. 2003.

Joseph, M., "The UML for Data Modellers," Elektron, Apr. 2004, pp. 72-73.

Wang, G, et al., "Extending XML Schema with Nonmonotonic Inheritance," in M.S. Jesufeld and O. Paster (eds.), ER 2003 Workshops, Lecture Notes in Computer Science 2814:402-407, 2003.

Adobe, Inc., et al., "Adobe Photoshop CS Classroom in a Book," Dec. 1, 2003, pp. 1-29.

Adobe, Inc., et al. "Adobe Photoshop 7.0," 2001; pp. 1-9.

Cohen, et al., "A Case for Associative Peer to Peer Overlays," - ACM SIGCOMM Computer Communications Review, vol. 33, No. 1, Jan. 2003, pp. 95-100.

Lui, et al., "Interoperability of Peer-to-Peer File Sharing Protocols" - ACM SIGecom Exchanges, vol. 3, No. 3, Aug. 2002, pp. 25-33.

Heinlein, et al., Integration of message passing and shared memory in the Stanford FLASH multiprocessor, Architectural Support for Programming Languages and Operating Systems, pp. 38-50, Year of Publication:1994.

Louis, et al., Context learning can improve user interaction Information and Reuse and Integration, Proceedings of the 2004 IEEE International Conference on Nov. 8-10, 2004 pp. 115-120.

OA dated Aug. 30, 2010 for U.S. Appl. No. 10/402,075, 12 pages.

* cited by examiner

```
/// <ExternalAPI/>                                           1510
    /// <summary>
    /// Use this object to send a balloon Notification to the user. You can derive
this class if you need to add custom properties to this object so that you can have more
context when a NotificationClickedEvent arrives.
    /// </summary>
    public class Notification
    {
    public:
        Notification();                                      1520

/// <summary>
    /// This is the icon for your notification. Minimum size is 16x16, and
maximum size is 80x80.
    /// </summary>
        property ImageData HeaderIcon; get, set              1530

/// <summary>
    /// This is the title text for you notification.
    /// </summary>
        property String HeaderText; get, set                 1540

/// <summary>
    /// This is the main body text of your notification.
    /// </summary>
        property String BodyText; get, set                   1550

/// <summary>
    /// Set this property to true if you want the user to be able to click inside a
notification to trigger some event.
    /// </summary>
        property bool IsBodyClickable; get, set
        void AddButton(NotificationButton button);
        event NotificationClickedEventHandler
NotificationClickedEvent;
```

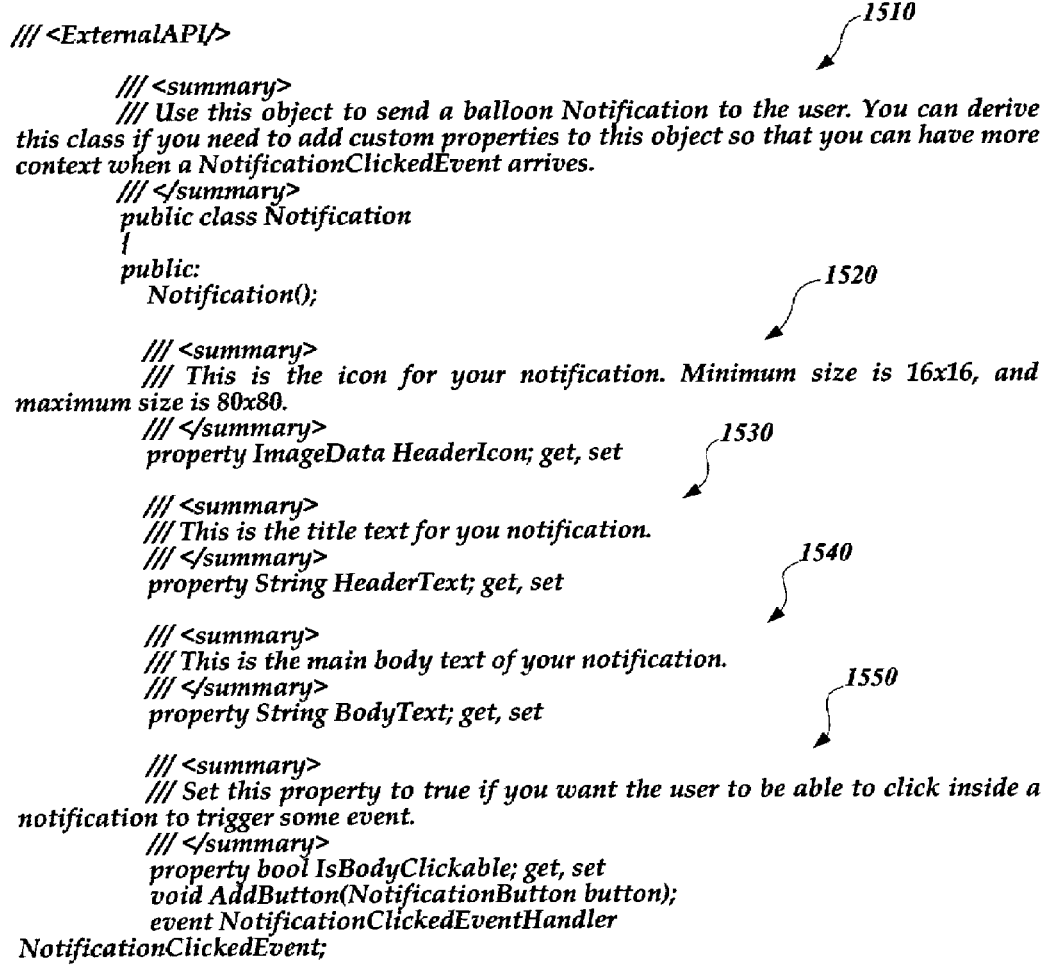

1560
    /// <summary>
    /// Call this method after setting all the relevant Notification properties
when you are ready to send this so that it will be shown to the user. This method
returns immediately.
    /// </summary>
    void Send();                                     1570

/// <summary>
    /// Use this to update a notification that has already been sent. You can
change some properties and then call Update() to have the changes be reflected.
    /// </summary>
    void Update();
                                        1580
    /// <summary>
    /// Call this if you want to know if a particular notification would actually
draw on screen at this time.
    /// </summary>
    bool WouldNotificationShow();          1590

/// <summary>
    /// Call this when you want to recall a notification that was already sent,
but that has become obsolete.
    /// </summary>
    void Revoke();
};
```

*Fig. 15B.*

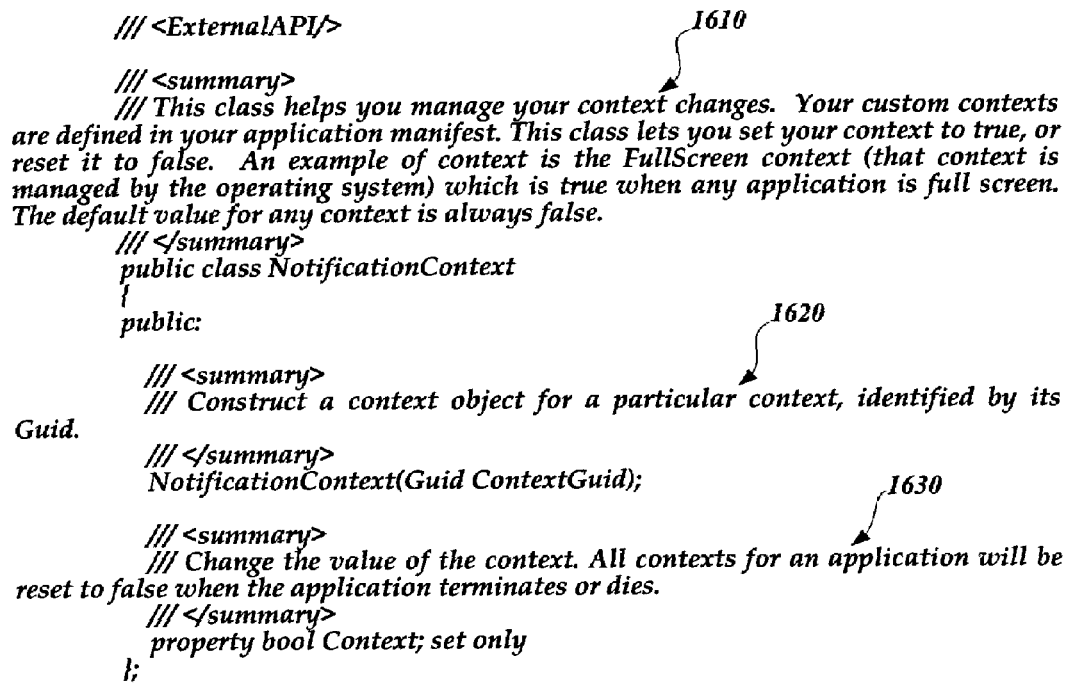

```
/// <ExternalAPI/>                              ╱1610

/// <summary>
/// This class helps you manage your context changes. Your custom contexts
are defined in your application manifest. This class lets you set your context to true, or
reset it to false.  An example of context is the FullScreen context (that context is
managed by the operating system) which is true when any application is full screen.
The default value for any context is always false.
/// </summary>
    public class NotificationContext
    {
    public:
                                                 ╱1620
        /// <summary>
        /// Construct a context object for a particular context, identified by its
Guid.
        /// </summary>
        NotificationContext(Guid ContextGuid);
                                                 ╱1630
        /// <summary>
        /// Change the value of the context. All contexts for an application will be
reset to false when the application terminates or dies.
        /// </summary>
        property bool Context; set only
    };
```

Fig. 16.

SYSTEM AND METHOD FOR PUBLIC CONSUMPTION OF COMMUNICATION EVENTS BETWEEN ARBITRARY PROCESSES

CROSS-REFERENCES TO RELATED APPLICATIONS

This application is a continuation-in-part of U.S. patent application Ser. No. 10/692,324, filed Oct. 23, 2003, which is a continuation-in-part of U.S. patent application Ser. No. 10/402,075, filed Mar. 26, 2003, each of which is hereby incorporated by reference in its entirety, and priority from the filing dates of which is hereby claimed under 35 U.S.C. § 120.

FIELD OF THE INVENTION

The embodiment of the present invention relates to notifications and related communication events in computing systems, and more particularly, a system and method for public consumption of communication events between arbitrary processes.

BACKGROUND OF THE INVENTION

In computer systems, a notification may be in the form of a signal from a program that indicates to a user that a specified event has occurred. Such a notification may contain various elements of text, sound, and graphics. Other properties may also be included with the notification, such as priority, the person who sent the notification (for channels such as e-mail or instant messaging), and when the notification expires. Notifications may also include some elements of code such that the user can interact with the notification and launch arbitrary code (e.g., clicking on buttons or text within the notification that can cause new programs to launch or actions to be taken on programs that are currently running).

An operating system may create notifications to let a user know about network connectivity and updates. An instant messaging program that uses "contact lists" may draw notifications on the screen to let the user know what is happening with the contact list or when a contact initiates an instant message conversation. Other programs may provide similar notifications that draw in similar areas of the display. One issue with these types of notifications is that they are not generally aware of the other notifications, thus sometimes leading to notifications being drawn on top of other notifications.

Another issue with existing notification systems is that they may cause notifications to be delivered inappropriately, or at inappropriate times. For example, for a user providing a full screen presentation, it may be inappropriate to have other programs draw notifications on the screen during the presentation. An example of a program that might draw such inappropriate notifications is an instant messaging program that runs in the background of the operating system and draws such notifications when contacts in the contact list sign on or initiate an instant message. This type of "interruption" during a presentation may be undesirable to a user.

Furthermore, when a notification is sent at an inappropriate time, the sender of a notification is often unaware that the timing was inappropriate. In known systems, the senders of notifications are typically not provided with adequate feedback regarding the timing of the sending of the notifications. In addition, no other programs or processes are typically provided with any information about the notifications.

The embodiment of the present invention is related to providing a system and method that overcome the foregoing and other disadvantages. More specifically, the embodiment of the present invention is related to a system and method for public consumption of communication events between arbitrary processes.

SUMMARY OF THE INVENTION

A system and method for public consumption of communication events between arbitrary processes is provided. In accordance with one aspect of the invention, mechanisms are provided for allowing processes to obtain information regarding when notification events are occurring, and specifically targeting communication-type notification events, and allowing the processes to act on these events on the user's behalf. This functionality is provided in a notification system in which various processes provide input to the system as to how busy the user is and whether or not it is an appropriate time to interrupt the user with some secondary information (e.g., a notification), such as a communication from another person or some news generated by a Web service. In such a notification system, incoming notifications may be evaluated against rules that the user establishes such that the notifications that are delivered can be explicitly the ones most significant to the user, even during times when the system might otherwise be set in a mode where the user is indicated as being busy or otherwise unavailable to interruption.

In accordance with another aspect of the invention, a process is able to respond to the sender of a notification with information regarding the status of a user. In one example, where the process is a calendaring program, a sender of a notification may be provided with information such as that the user is busy giving a presentation at the present time but that the calendar indicates that the user will be free at a later specified time.

In accordance with another aspect of the invention, a number of processes may be utilized as part of the system and method for public consumption of communication events. Each of the processes may comprise a program that is responsible for specified functions. In the following example, three processes are described. The first process may be a program that is running a full screen, which signifies to the notification system that the user is not available to interruption. For example, the user may be giving a presentation or may be otherwise fully occupied such that it is inappropriate to attempt to interrupt the user at this time. A second process may then attempt to send a notification to the user from another person. This could be any kind of communication program (e.g., e-mail, instant messaging, a telephone program, etc.). In this circumstance, the notification system may evaluate the user's current context as "busy," and the incoming notification would be evaluated against the user rules which may determine that the current notification should not be shown on the screen at the present time. A third process may be one that has registered to be informed when "communication" events occur. This third process is a program that has some domain knowledge of the user's activities outside of the data that the notification system has. For example, the third process may be a calendaring program that may have knowledge of what activities the user is currently engaged in (e.g., that the user is scheduled to be giving a presentation during selected times of the day). In this scenario, a copy of the notification that was sent from the second process (e.g., instant messaging) may be provided to the third process (e.g., calendaring program) along with a statement as to whether or not the notification was delivered. The third process (e.g., calendaring program) may then evaluate certain factors such as the identity of the person from which the notification originated, how important that person is to the current user (e.g., using selected heuristics), and may respond to the person who originated the notification with a customized "busy announcement" (e.g., the user you are trying to contact is doing a presentation right now, but if you try and contact him at time x, you will likely be successful, as his calendar is free then). It will be appreciated that in this scenario, the system and method of the embodiment of the present invention effectively act as a type of automated assistant for the user, and provide a mechanism by which the system may effectively act to broker a user's communications and thus provide a more effective communication system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 15A and 15B are diagrams illustrative of pseudo code for a notification API;

FIG. 16 is a diagram illustrative of pseudo code for a context setting API;

DETAILED DESCRIPTION OF THE PREFERRED EMBODIMENT

In known systems, there have typically been numerous competing elements which want to send notifications to a user, each of which designs its own way to send such notifications. None of the competing elements have generally been aware of the other notifications and thus have tended to draw on top of each other and each other's applications, which can lead to conflicts when each chooses to render an indication of their respective notifications at the same time. Additionally, there has been no shared notion of user context, leading to some notifications being delivered inappropriately, or at inappropriate times. These issues may be addressed by building notifications as a rich part of the operating system, such that the user interfaces for notifications provided by the system become similar and thus stop conflicting with one another because the system appropriately brokers and serializes their on-screen rendering. In addition, the notifications provided by the system can be considered to be more valuable because they are delivered when the user is more receptive to them, and in addition the use of common rules helps the user to eliminate undesired notifications. Furthermore, in accordance with the embodiment of the present invention, the system may also enable public consumption of communication events between arbitrary processes.

Figure 1:
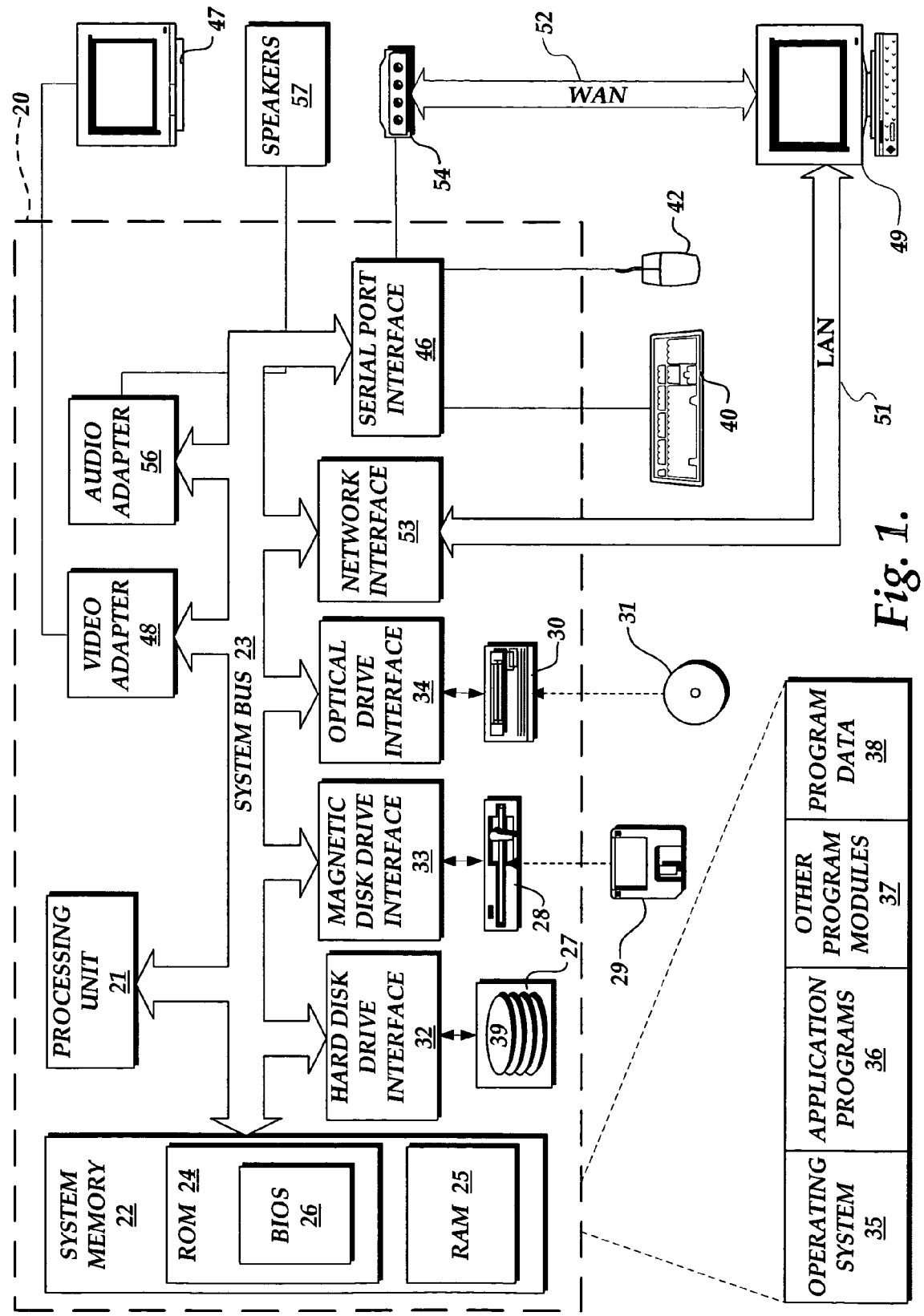
FIG. 1 is a block diagram of a general purpose computer system suitable for implementing the embodiment of the present invention.

FIG. 1 and the following discussion are intended to provide a brief, general description of a suitable computing environment in which the embodiment of the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that helps to transfer information between elements within the personal computer 20, such as during start-up, is stored in ROM 24. The personal computer 20 further includes a hard disk drive 27 for reading from or writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. The local area network 51 and wide area network 52 may be wired, wireless, or a combination thereof. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

As will be described in more detail below with respect to FIGS. 2-10, in one embodiment a user context system may consist of three elements that are compared for a decision as to how to process a notification. The first element is the user's context (as may be provided by the operating system and arbitrary programs that have extended it). The second element is the user's rules and preferences. The third element is the notification itself (which contains elements such as data and properties that may match the user's rules).

As will be described in more detail below, the system operates by the operating system and other programs declaring a user's contexts, after which the system brokers the user's context and rules. Notifications are raised by other programs calling into the system. The user's context, rules, and elements of the notification are compared and then a determination is made as to what should be done with the notification. Examples of various options for what may be done with the notification include denying (if the notification is not allowed to draw or make noise, and the notification is to never be seen by the user), deferring (the notification is held until the user's context changes or the user's rules dictate that it is subsequently appropriate to deliver), delivering (the notification is allowed to be delivered in accordance with the user's context and rules), and routing (the user's rules indicate that the notification should be handed off to another system, regardless of whether the notification is also allowed to be delivered in the present system).

Various routines for delivering a notification are described in more detail below. In general, the user may be in a state deemed "unavailable" in which case the notification is either not delivered or held until the user becomes "available". For instance, if the user is running a full screen application, that user may be deemed unavailable. Or, the user may be "available" but in such a state that the notification needs to be modified to be appropriate for the user. For instance, if the user is listening to music or in a meeting, the user may have indicated that the notifications should be delivered to the user's screen but that the sound they make should be either quieter or not made at all.

As noted above, the user context determines in part whether notifications are shown on the user's screen. When a notification is shown, it may be shown based on certain gradients within the user context. In other words, there are different levels of invasiveness of the form of the drawn notification that may be specified. For example, a normal notification is free to pop out into the client area and briefly obscure a window. If the user is in a slightly restrictive context, the notification may be free to show, but only in a less invasive manner, such as it might not be allowed to draw on top of another window. As another example, in one embodiment where the user is running a maximized application, the default setting may be that this means that context is slightly restricted, and that the user has clearly made a statement that they want this application to get the entire client area. In this setting, a notification may still be allowed to draw, but may be made to only appear within the sidebar. In other words, this type of reduced invasiveness in the notification drawing form lessens the impact of the notification, and overall lessens the cognitive load.

Figure 2:
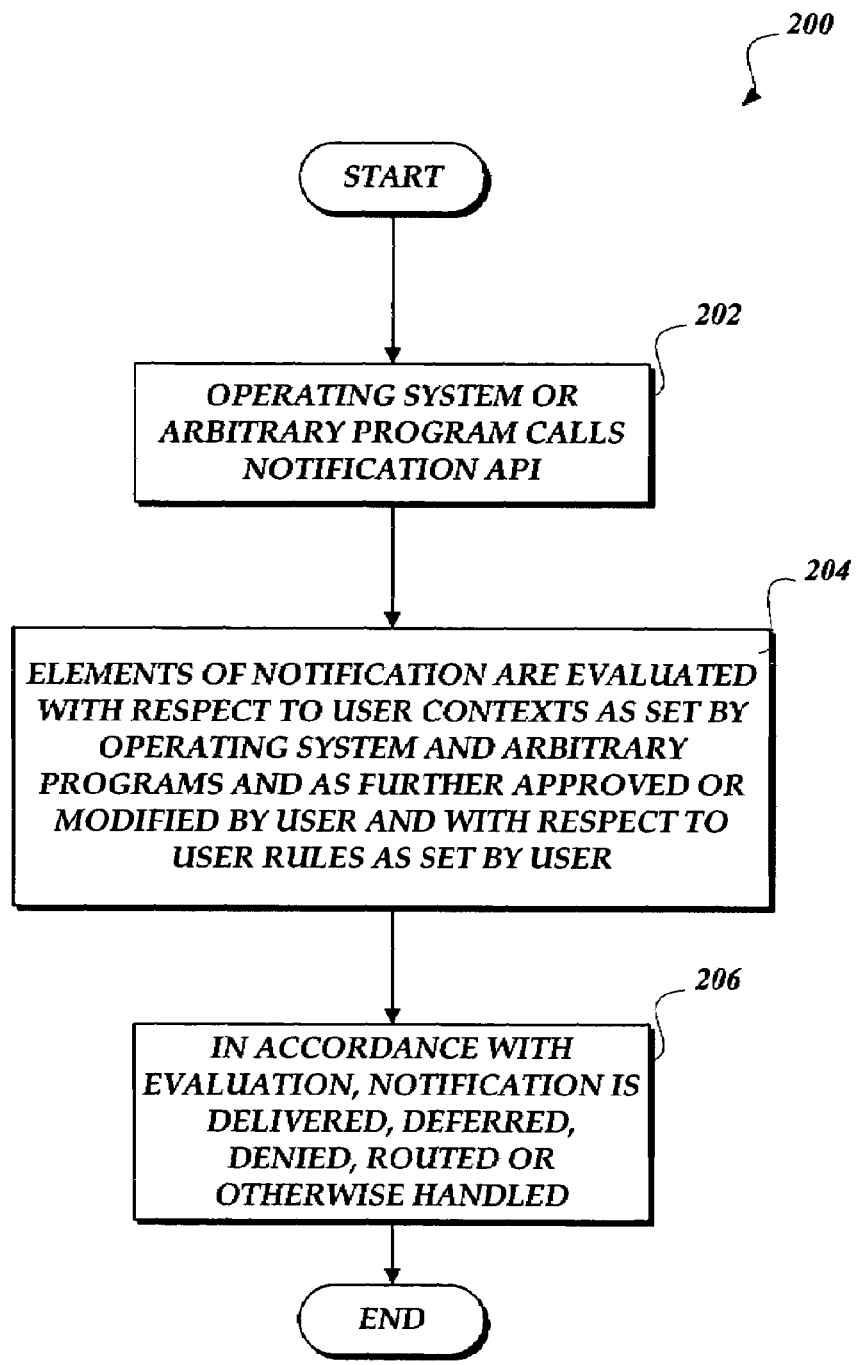
FIG. 2 is a flow diagram illustrative of a general routine for processing a notification in accordance with the embodiment of the present invention.

FIG. 2 is a flow diagram illustrative of a routine 200 for processing a notification. At a block 202, the operating system or an arbitrary program calls a notification application programming interface (API). At a block 204, the elements of the notification are evaluated with respect to user contexts as set by the operating system and arbitrary programs, and as further approved or modified by the user, and with respect to user rules as set by the user. At a block 206, a notification is delivered, deferred, denied, routed, or otherwise handled in accordance with the user contexts and user rules.

The user contexts and user rules will be described in more detail below. In one embodiment, a user context consists of a condition that may be either true or false, and an instruction for determining how a notification should be handled when the condition is true. In general, the condition of a user context can be thought of as a state that the system assumes makes the user in some way unavailable for notification delivery or that causes the way that the notification is delivered to be different from how it was sent by the program that initiated it. In other words, in one embodiment a user context can be thought of as a statement that "while condition X is true, then this is what should be done with incoming notifications." An example would be "when my music player is playing music for me, incoming notifications should show on the screen but not play sound." Another example would be "while any application is running in full screen mode, incoming notifications should be deferred until later."

With respect to such user contexts, in one embodiment a user may also define special rules for handling incoming notifications, and thus may provide for special exceptions to the instructions of the user contexts. As an example, a user rule might state "when I receive a new e-mail from 'John Doe,' and with 'urgent' in the text, and marked 'high priority,' deliver the e-mail regardless of other user contexts." In other words, in this example this user rule provides an exception to a user context which would otherwise indicate that it is inappropriate to deliver a notification for an incoming e-mail at this time. With regard to the elements of the notification that the user rules are evaluated with respect to, these may include things like text, sound, graphics, and other properties such as priority, the person who sent the notification (for channels such as e-mail or instant messaging), when the notification expires, and some elements of code such that the user can interact with the notification and launch arbitrary code (e.g., clicking on buttons or text within the notification can cause new programs to launch or actions to be taken [such as deleting e-mail] on programs that are currently running).

Figure 3:
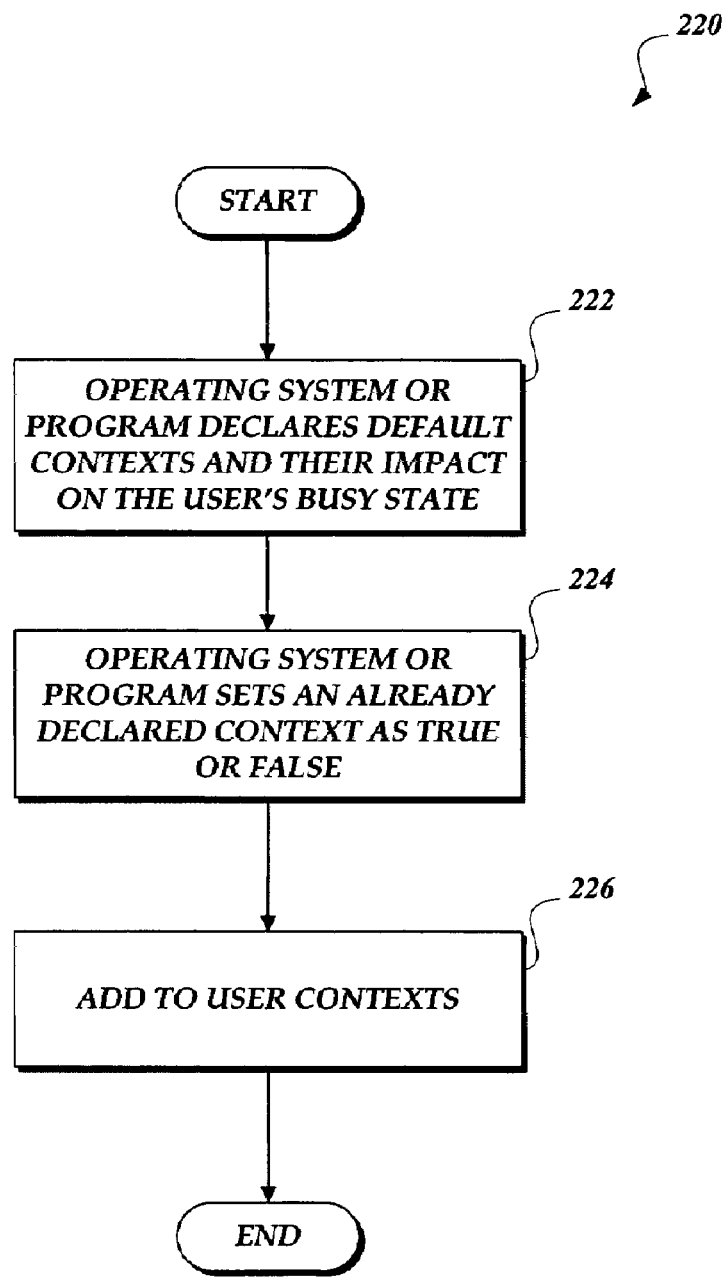
FIG. 3 is a flow diagram illustrative of a routine for an operating system or arbitrary program declaring user contexts.

FIG. 3 is a flow diagram illustrative of a routine 220 for an operating system or arbitrary program declaring user contexts. At a block 222, the operating system or program declares the default contexts and their impact on the user's busy state. In other words, programs register with the system and provide user contexts including the impact they have on the notifications (e.g., if drawing on the screen is appropriate and whether or not sound is appropriate or at what relative volume sound should be played). As an example, a music player program may declare a default context that states "when the music player is playing music for the user, incoming notifications should show on the screen but not play sound." As another example, the operating system might declare a context which states "while any application is running in full screen mode, incoming notifications should be deferred until a later time."

Returning to FIG. 3, at a block 224, the operating system or program sets the declared context as true or false. For example, with regard to the music player declaring the context of "when the music player is playing music, incoming notifications should show on the screen but not play sound," the music player program also sets this declared context as currently being true or false. In other words, the music player program indicates whether it is true or false that the music player is currently playing music. As will be described in more detail below, in one embodiment, the determination of whether a context is true or false may also be evaluated at the time the notification API is called, or at the time the user rules and exceptions are re-evaluated. As an additional feature, the system may also check to see if the calling program has not terminated unexpectedly or forgotten to reset the context, and the system will modify its settings appropriately due to this data. One specific implementation of this feature would be the system tracking the process handle of the calling program (it will be appreciated that other means may also be used for checking on the calling program), such that if the process terminates without first resetting the context value to its default 'false' value, the system will reset the context value as soon as it detects that the initial process does not exist any more (in one embodiment, the process handle state is set to signal when the process terminates, and that state change is picked up by the system which watches the process handle). This ensures that if processes terminate unexpectedly or forget to reset the context, then the delivery of further notifications will not be unduly affected. For example, if in the above example the music player program has been closed and the process is no longer present, then the context may automatically be reset to false. As another example, if a program originally declares a user as being busy, but then the program crashes, such that the process is no longer present, the context may automatically be set to false rather than leaving the user stuck in a state where notifications would not be received. In any event, whether or not a context is actively set or is evaluated as a function, in one embodiment the contexts can generally be resolved to be either true or false.

Returning to FIG. 3, at a block 226, the context information is added to the user contexts that are stored in the system. This process is repeated by additional programs declaring contexts. In addition, as noted above, the state of whether already declared contexts are true or false will change over time as the user opens and closes different programs and undertakes different tasks.

As noted above, in one embodiment registering a context is a declarative process. As will be described in more detail below, in accordance with one aspect of the invention, by registering the user contexts, the user can be presented with a list of the contexts so that the user can choose to not accept certain contexts or to change what they mean if the user disagrees with the context parameters. As noted above, in one embodiment, a context may consist of a condition that may be true or false, and an instruction for what to do with notifications when the condition is true. In this regard, a user context may comprise specific programming elements, such as: a human readable string (for the end user to know what is meant); a unique identifier (such as a globally unique identifier, aka GUID) so that the program can tell the operating system when this context is true or not; and the instruction which may comprise a statement of what this context means in terms of notifications drawing on screen (as may include invasiveness level, sound, and volume). A context may also be dynamic, as will be described in more detail below.

Figure 4:
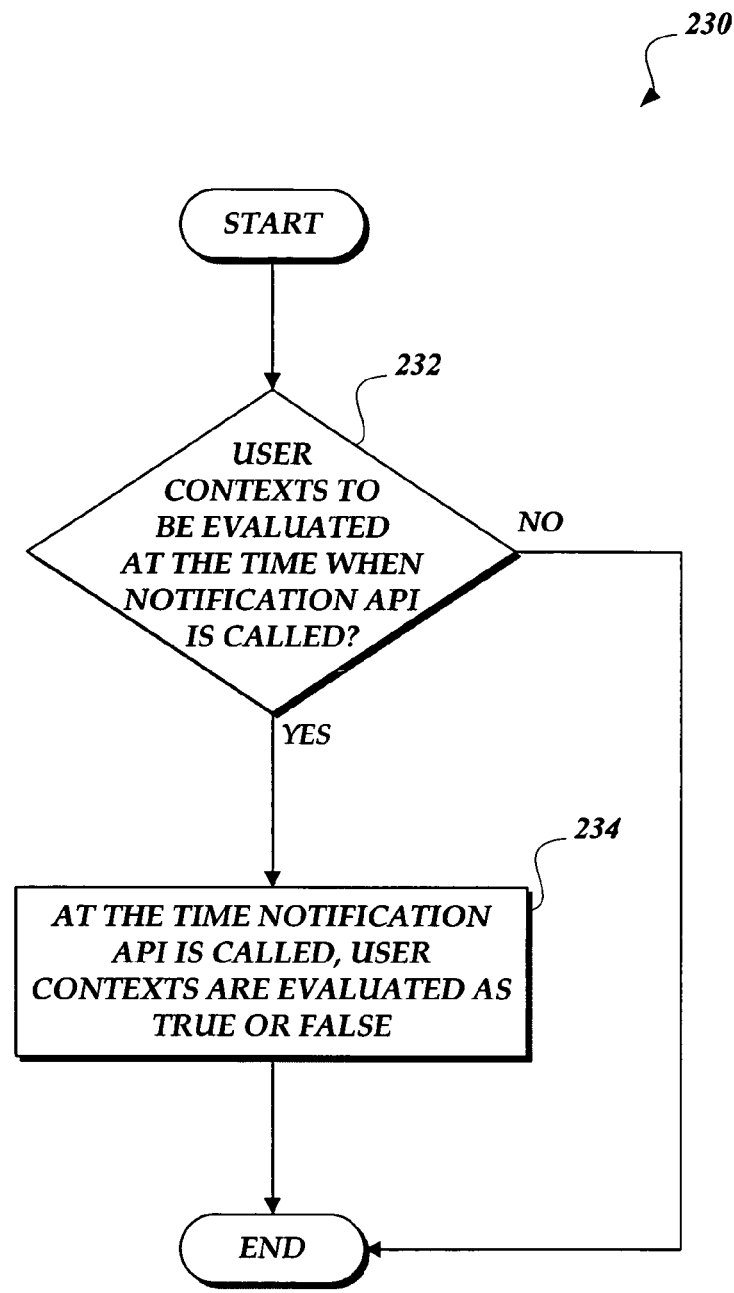
FIG. 4 is a flow diagram illustrative of a routine for evaluating user contexts as true or false at the time a notification API is called.

FIG. 4 is a flow diagram illustrative of a routine 230 for a context to be evaluated as true or false at the time the notification API is called. At a decision block 232, a determination is made whether the user contexts are to be evaluated at the time when the notification API is called. If the user contexts are to be evaluated, then the routine proceeds to block 234. If the user contexts are not to be evaluated at the time when the notification API is called, then the routine ends. At block 234, the user contexts are evaluated as true or false.

As illustrated by FIGS. 3 and 4 and as noted above, a context may be proactively set or it may be a function that is evaluated at a relevant time. As an example, a program may actively note that a user is listening to music. As another example, when a notification is evaluated, the program may have registered its callback such that the program is queried by the system at the time the notification is evaluated whether the context is true. One example of a case where this second process can be particularly important is when a user context is combined with a user rule to form a dynamic context. (User rules will be described in more detail below.) A specific example of a user context combined with a user rule would be when a user has set a rule that states "people who I'm meeting with right now can always send me notifications irrespective of my busy state." In this case, the user context of "when the user is in a meeting," must further be evaluated in terms of who the user is in the meeting with. In this example, the program that handles the meetings may register this as a dynamic context, and when a notification is evaluated, the person who sent the notification is evaluated against this context (which otherwise could not be declared as true or false proactively, since the people attending the meeting may change over time). In other words, this particular example requires evaluation of a user's context in light of a user rule that depends on other people's contexts.

Figure 5:
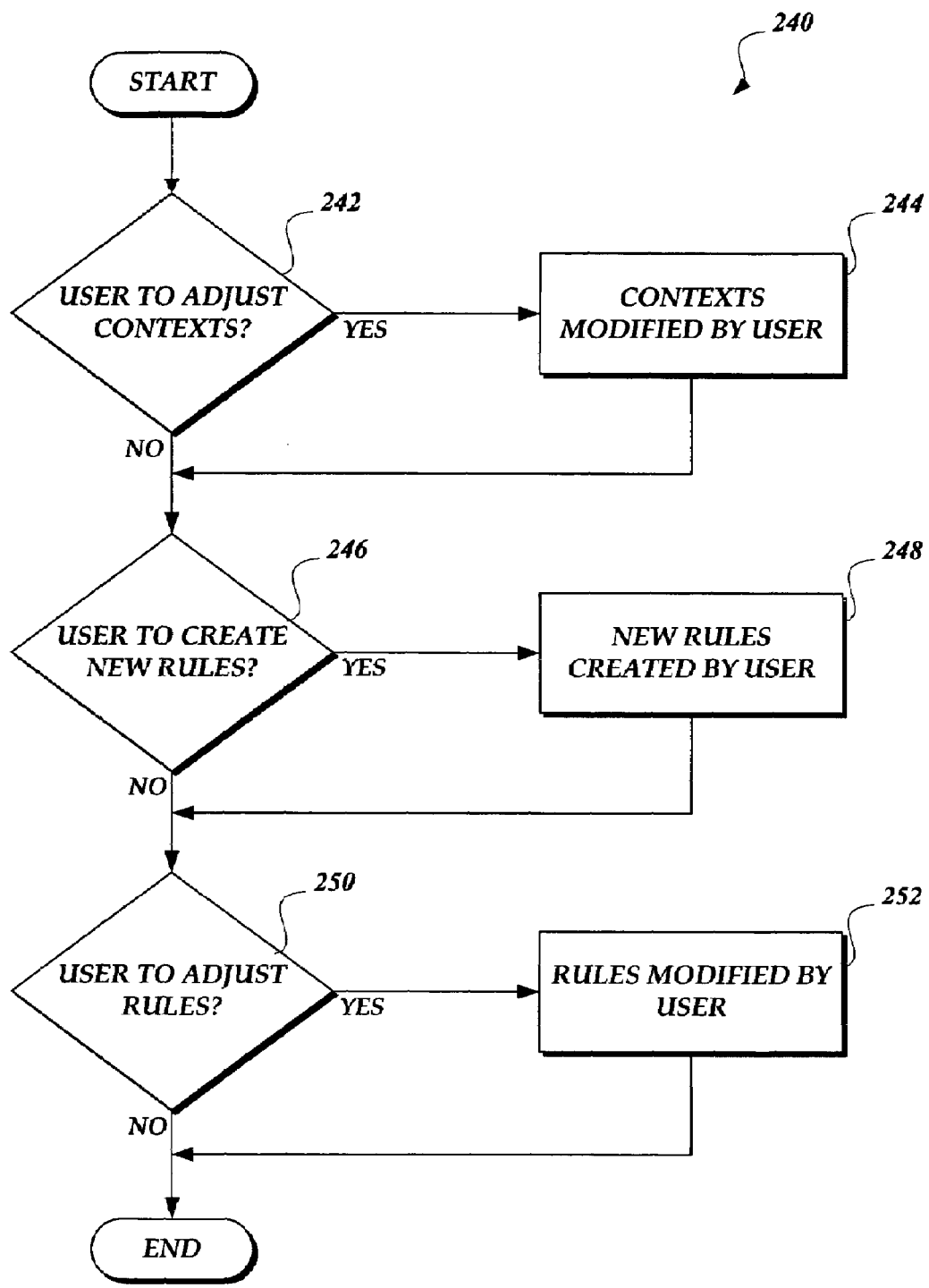
FIG. 5 is a flow diagram illustrative of a routine for adjusting user contexts and creating new user rules.

FIG. 5 is a flow diagram illustrative of a routine 240 by which a user may adjust contexts and create new rules. At a block 242, a determination is made whether the user wishes to adjust the contexts. If the user does not wish to adjust the contexts, then the routine proceeds to a decision block 246, as will be described in more detail below. If the user does wish to adjust the context, then the routine proceeds to a block 244, where the user makes modifications to the contexts.

In one embodiment, the contexts that have been provided may be exposed to a user in a manner which allows the user to either turn the contexts off (e.g., the user doesn't agree with the program's assessment of the context), or to change the context in terms of the impact on delivery of a notification. As more specific examples, user contexts can include things like "while any application is running in full screen mode"; "when I'm playing music or video"; "when my meeting manager shows me in a meeting"; or "when my out of office assistant is turned on." For each of these, the user could be allowed to make selections that specify an instruction that when the given condition is true, the incoming notifications should follow selected procedures. The instructions can specify things like whether or how the notification will draw on the screen, and the sound or volume that the notification will make. For the volume, the user can specify a percentage of desired volume under the given condition. For the options for drawing the notification on the screen, the user can be provided with options such as not drawing the notification at all, or drawing the notification only on a specified external display, or drawing the notification on the present screen. For the drawing of a notification, different levels of invasiveness can be specified. For example, if a user is running a maximized application, such that the context is slightly restricted, the invasiveness setting might be such that notifications can still draw, but might appear only within a sidebar.

Returning to FIG. 5, at decision block 246, a determination is made whether the user wishes to create new user rules. If the user does not wish to create new user rules, then the routine proceeds to a decision block 250, as will be described in more detail below. If the user does wish to create new user rules, then the routine proceeds to a block 248, where new rules are created. In general, user rules dictate how notifications that contain specified elements should be handled. For example, a rule may dictate that notifications from a specified person should always be delivered immediately, and this rule can be applied to all notifications, irrespective of which program initiated the notification as long as it is from the specified person. As more specific examples, other user rules may be directed to things like "MSN auto's traffic alerts for Bremerton, Wash." and "important e-mails from John Doe." As an example of a user rule for an important e-mail from John Doe, the rule could dictate that any e-mails that arrive from John Doe, and with "urgent" in the text, and marked "high priority," should follow specified handling conditions. The handling conditions could specify that the notification should be delivered immediately and that the user should be required to acknowledge it. In general, requiring a user to acknowledge a notification means that there is a slightly raised elevation in the form of the notification's invasiveness, in that the notification will stay on-screen until the user specifically dismisses it. In one embodiment, the requiring of a user's acknowledgement is only settable via a user rule. As another example, the rules could also specify a custom sound to be played for the notification, at a specified volume, so as to provide an alert to the user that a special notification has arrived. Different settings may also be selected for how the notification should be handled during "normal" and "busy" conditions for the user, as may be determined by the user's context. The handling instructions may also include things like routing options for the notification, such as "deliver notifications from John Doe to my pager." In one embodiment, when the context is evaluated, the most restrictive currently true context is the one that is applied. When user rules are evaluated, it means that a particular notification has matched the rule that the user has created, in which case the most invasive setting is applied from the user rules which have matched the notification. In other words, in the user rules, a user has specified something to be of importance, and this procedure is intended to follow the user's preferences. If there is a conflict between two rules, the most invasive is applied.

In one embodiment, the user rules may also be directed to controlling the delivery of notifications from specific notification services. For example, an operating system that provides notifications in accordance with a notification service may provide the user with a way to modify how the notifications are delivered. For example, the specified notification service may provide "traffic alerts for Seattle", and the user may edit the delivery to be such that when such notifications are received the system should "show the notification and play sound."

Returning to FIG. 5, at decision block 250, a determination is made whether the user wishes to adjust any of the already existing user rules. If the user does not wish to adjust any of the rules, then the routine ends. If the user does wish to adjust the user rules, then the routine proceeds to a block 252, where the user makes modifications to the rules.

As described above with respect to FIGS. 3-5, the user contexts and user rules are set by the operating system, programs, and the user. The system appropriately brokers and serializes the delivery of the notifications in accordance with the user's preferences. The user contexts and user rules may be exposed to the user such that the user can modify or adjust the various contexts and rules, or create new rules. This provides the user with a centralized way to manage preferences for how notifications are handled. It will be appreciated that this allows a user to effectively manage the many competing elements in a computing system that may want to send notifications to the user.

Figure 6:
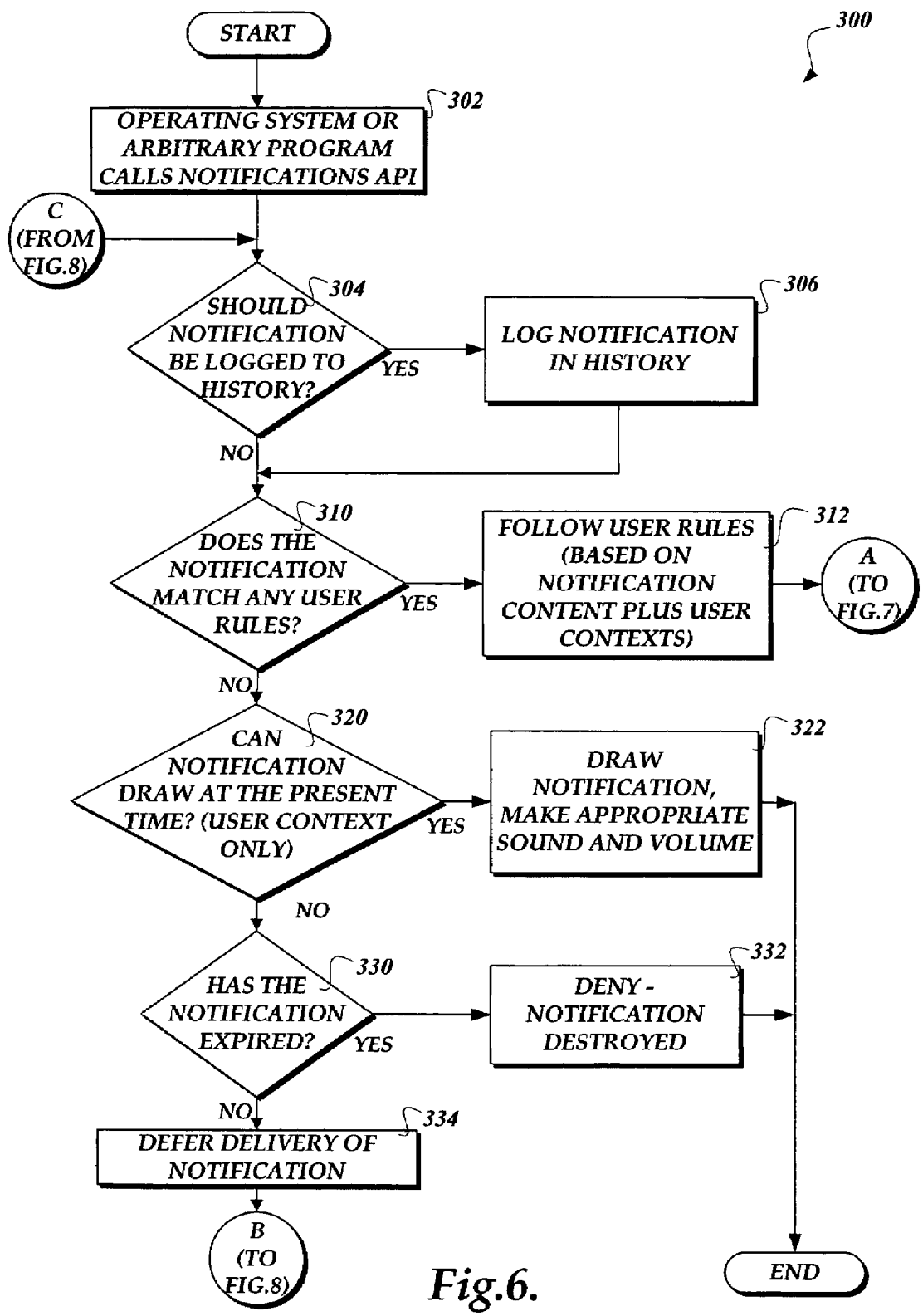
FIG. 6 is a flow diagram illustrative of a routine for processing a notification in accordance with user contexts and user rules.

FIG. 6 is a flow diagram illustrative of a routine 300 for processing a notification in accordance with user contexts and user rules. At a block 302, the operating system or an arbitrary program calls the notifications API. At a decision block 304, a determination is made whether the notification should be logged to the notification history. If the notification is to be logged, then the routine proceeds to a block 306, where the notification is logged to the history. If the notification is not to be logged, then the routine proceeds to a decision block 310.

At decision block 310, a determination is made whether the notification matches any user rules. If the notification matches any user rules, then the routine proceeds to a block 312, where the user rules are followed (based on the notification content plus the user contexts), and the routine continues to a point A that is continued in FIG. 7. If at decision block 310 the notification does not match any user rules, then the routine continues to a decision block 320.

In one embodiment, user rules always outweigh the current user contexts. As noted above, user rules can be based on any element of the notification. For example, a rule that is based on an evaluation of the person who initiated the notification, can be applied to all notifications, irrespective of which program initiated the notification as long as it is from the person on which the rule is based (e.g., "John Doe" can always reach me). In addition, notifications may draw on the screen even during contexts that would otherwise cause it not to draw (e.g., "people who are in a meeting with me can always send me notifications", even though the user context generally states that the user is not to receive notifications during a meeting).

Returning to FIG. 6, at decision block 320, a determination is made whether the notification can draw at the present time (based on the user context only). If the notification can draw at the present time, then the routine continues to a block 322, where the notification is drawn, and appropriate sound and volume are provided. If it is not appropriate to draw the notification at the present time, then the routine proceeds to a decision block 330.

At the decision block 330, a determination is made whether the notification has expired. If the notification has expired, then the routine proceeds to a block 332, where the notification is destroyed. If the notification has not expired, then the routine proceeds to a block 334, where the notification is deferred, and the routine continues to a point B that is continued in FIG. 7.

Figure 7:
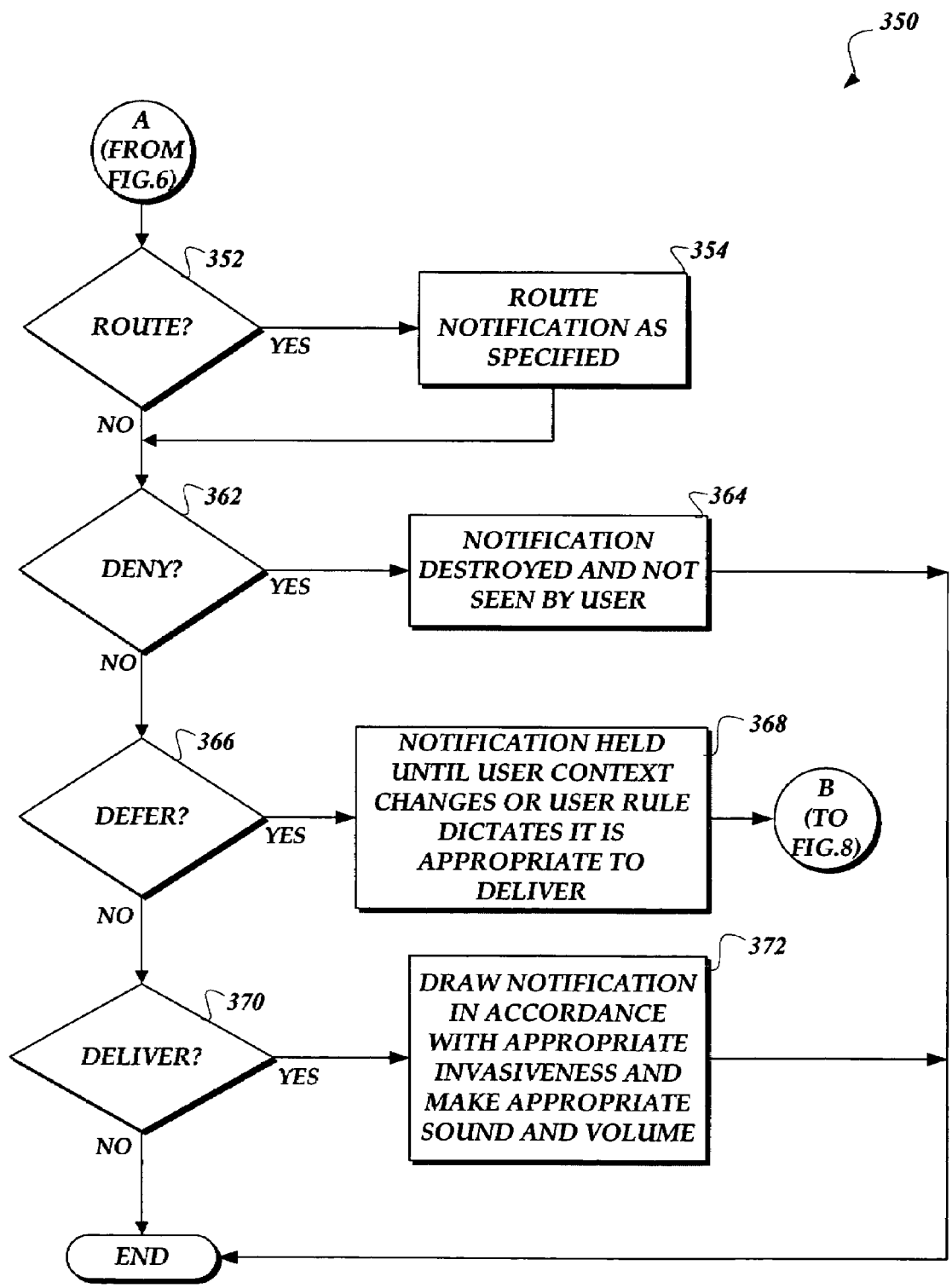
FIG. 7 is a flow diagram illustrative of a routine for implementing user rules based on a notification's content and the user contexts.

FIG. 7 is a flow diagram illustrative of a routine 350 for processing a notification in accordance with specified user rules. The routine is continued from a point A from FIG. 6, as described above. As illustrated in FIG. 7, at a decision block 352, a determination is made whether the notification should be routed. If the notification is not to be routed, then the routine continues to a decision block 362, as will be described in more detail below. If the notification is to be routed, then the routine proceeds to a block 354, where the notification is routed as specified. When a notification is routed, it indicates that the notification contains elements that match the user's rules that require the notification to be handed off to another system. This may happen if the user is busy, or it may happen on every notification that matches the criteria specified in the user's rules, whether or not the user is unavailable. As an example, a notification with the word "urgent" in it might always be forwarded to the user's pager, whereas other notifications might only be routed based on a combination of the user's rules and context.

Some examples of routing instructions include: "Forward this notification to an e-mail address"; "forward this notification to another PC"; "forward this notification to a pager"; "forward this notification to a cell phone"; or "forward this notification to an e-mail server." As will be described in more detail below, if the notification is routed, it may also be delivered and draw on the screen. In addition, the device to which the notification is forwarded may have this same context system implemented, and on that device there may be additional or different knowledge of the user's context, and the context system on that device may choose to do different actions with the notification.

Returning to FIG. 7, at decision block 362, a determination is made whether to deny the notification. If the notification is not to be denied, then the routine continues to a decision block 366, as will be described in more detail below. If the notification is to be denied, then the routine proceeds to a block 364 where the notification is destroyed and not seen by the user. In other words, a notification that is denied is not allowed to draw or make noise. For example, this may occur based on a user rule that states that a certain notification should be denied, or as described above with reference to block 332 of FIG. 6, when a notification has expired.

Returning to FIG. 7, at decision block 366, a determination is made whether the notification should be deferred. If the notification is not to be deferred, then the routine proceeds to a decision block 370, as will be described in more detail below. If the notification is to be deferred, then the routine proceeds to a block 368, where the notification is held until a user context changes, and the routine continues to a point B that is continued in FIG. 8. In general, deferring a notification indicates that the notification will be allowed to be delivered, but that the user's current context or rules are such that it is deemed inappropriate to deliver the notification at this time. As will be described in more detail below with reference to FIG. 8, once the user's context changes or alternatively when the user's rules indicate that it is subsequently appropriate, the notification will be delivered to the user's screen and allowed to draw and/or make its sound, as dictated by the user rules and user context.

Returning to FIG. 7, at decision block 370, a determination is made whether the notification should be delivered. If the notification is not to be delivered, then the routine ends. If the notification is to be delivered, then the routine proceeds to a block 372, where the notification is drawn in accordance with the appropriate level of invasiveness, and the appropriate sound and volume are provided. In other words, the notification is allowed to be delivered, though it is delivered in accordance with the user's context and rules (e.g., a notification may be allowed to be drawn but required to be silent).

Figure 8:
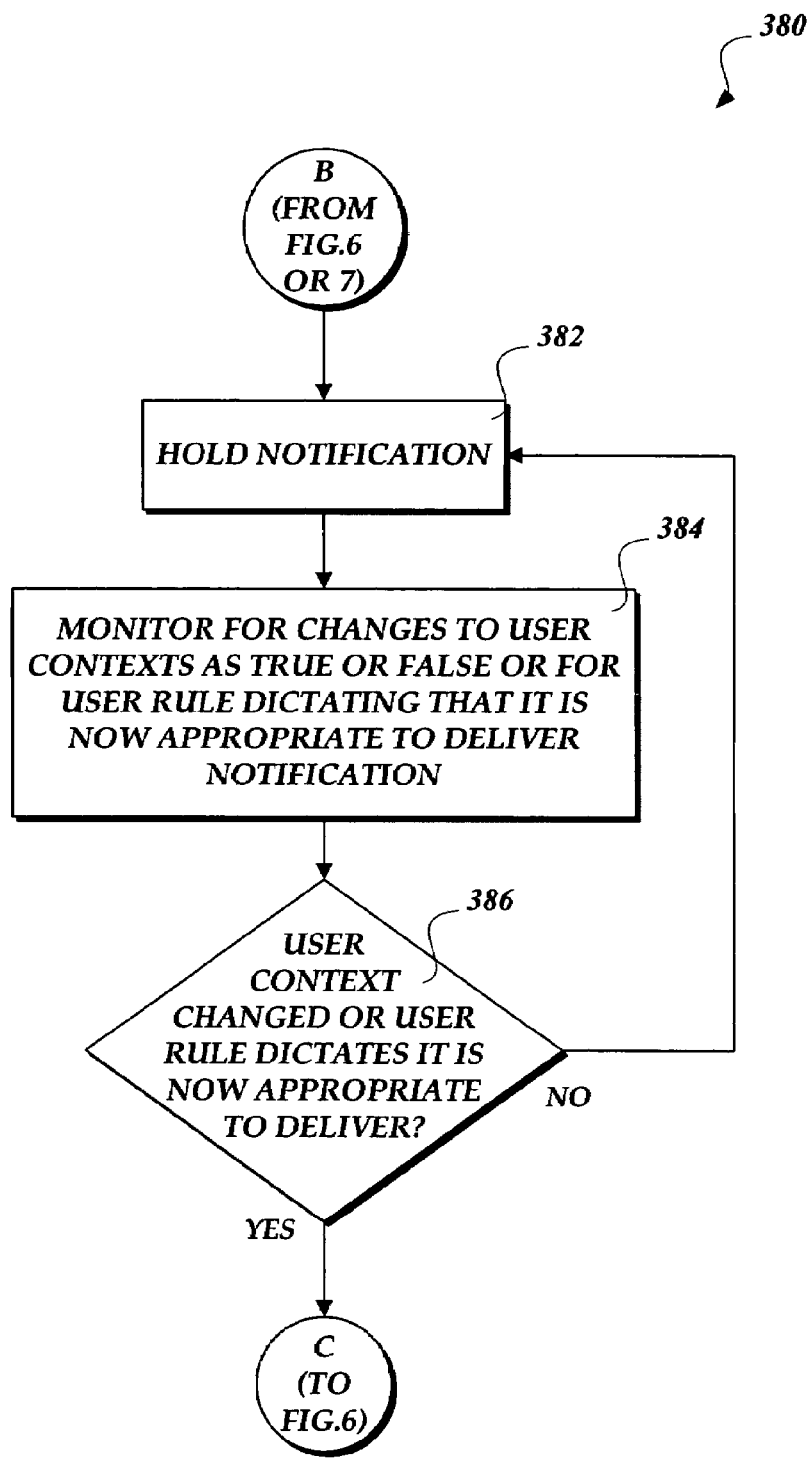
FIG. 8 is a flow diagram illustrative of a routine for deferring the delivery of a notification.

FIG. 8 is a flow diagram illustrative of a routine 380 for deferring the delivery of a notification. The routine is continued from a point B from either FIGS. 6 or 7, as described above. As illustrated in FIG. 8, at a block 382, the notification is held. At a block 384, the system monitors for changes to the declared contexts as being true or false, or for a user rule dictating that it is now appropriate to deliver the notification. At a decision block 386, a determination is made whether a user context has changed, or a user rule dictates that it is now appropriate to deliver the notification. If a user context has not changed and if no user rule otherwise dictates, then the routine returns to block 382, where the notification continues to be held. If the user context has changed or if a user rule dictates that it may now be appropriate to deliver the notification, then the routine proceeds to a point C which is continued in FIG. 6. Point C in FIG. 6 returns to the decision block 304, where the process for evaluating the notification starts over.

Figure 9:
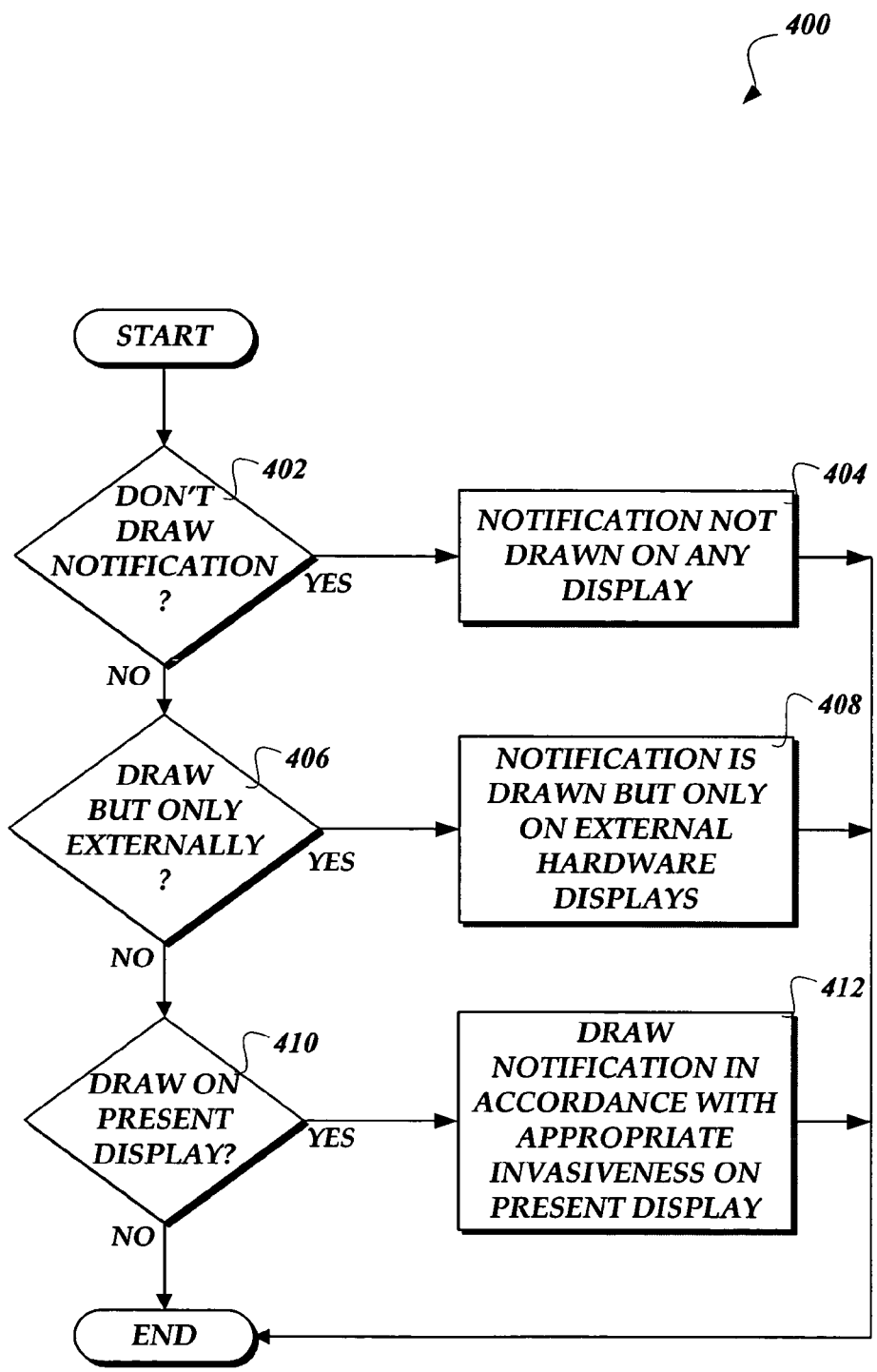
FIG. 9 is a flow diagram illustrative of a routine for determining how a notification will be drawn in accordance with various restrictive settings.

FIG. 9 is a flow diagram illustrative of a routine 400 for determining the drawing of a notification in accordance with various restrictions. It will be appreciated that this routine may be implemented as part of the processing of notifications, such as at block 322 of FIG. 6 or block 372 of FIG. 7. In general, when a notification enters the system, an evaluation is made of all of the contexts that are currently true, and the most restrictive settings for the notification are applied in accordance with the user's current state. As illustrated in FIG. 9, at a decision block 402, a determination is made whether the notification should not be drawn at all. If the notification is not to be drawn at all, then the routine proceeds to a block 404, where the notification is set to not be drawn on any display. If the notification is to be drawn, then the routine proceeds to a decision block 406.

At decision block 406, a determination is made whether the notification should be drawn but only externally. If the notification is only to be drawn externally, then the routine proceeds to a block 408, where the notification is drawn but only on external hardware displays. If the notification is not to be drawn on external hardware displays, then the routine proceeds to a decision block 410.

At decision block 410, a determination is made whether the notification should be drawn on the present display. If the notification is to be drawn on the present display, then the routine proceeds to a block 412, where the notification is drawn in accordance with the appropriate level of invasiveness on the present display. If the notification is not to be drawn on the present display, then the routine ends.

Figure 10:
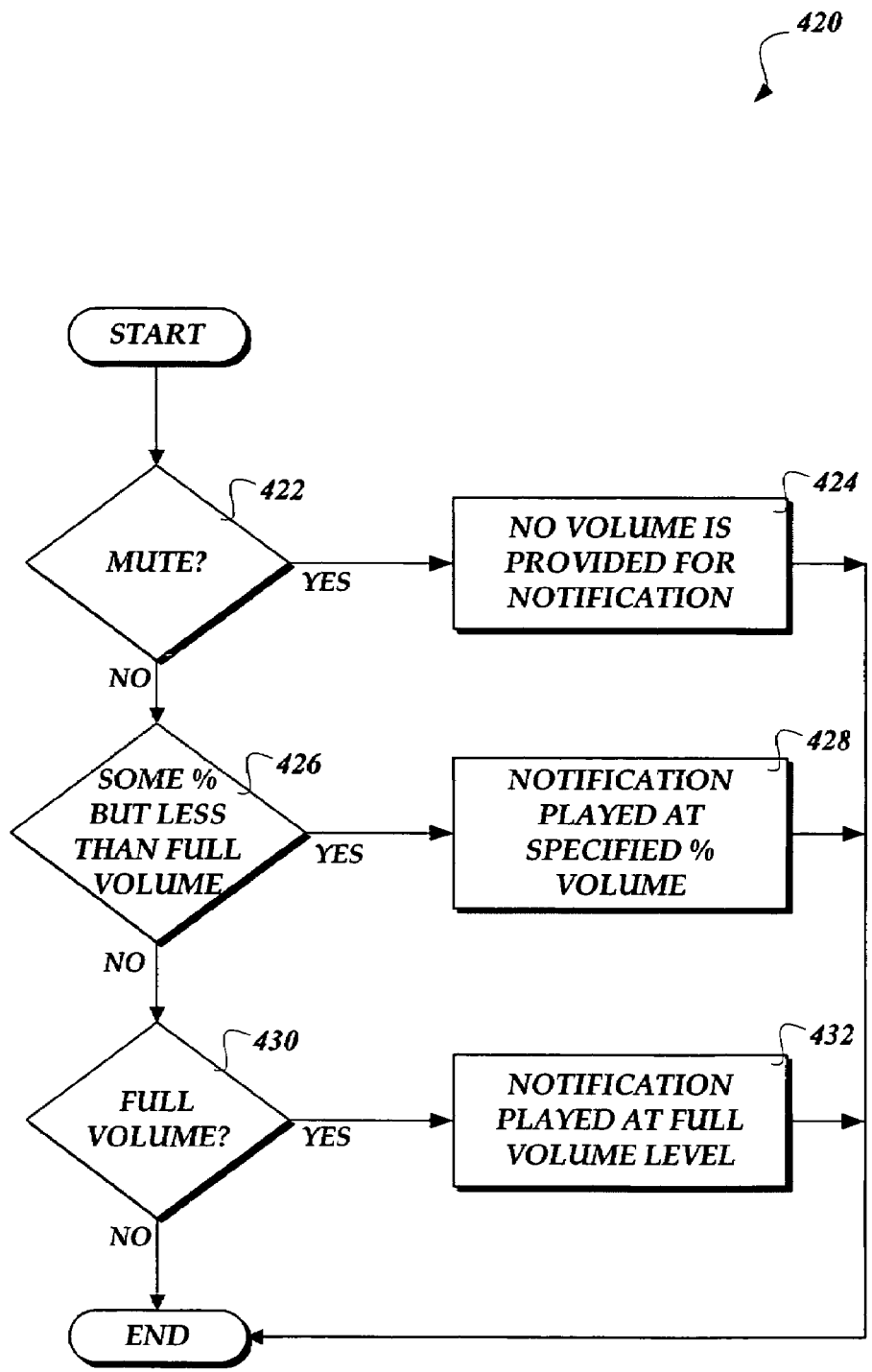
FIG. 10 is a flow diagram illustrative of a routine for determining a volume level for a notification in accordance with various restrictive settings.

FIG. 10 is a flow diagram illustrative of a routine 420 for determining the volume that will be played for the sound of a notification, in accordance with various restrictions. As was described above with respect to FIG. 9, it will be appreciated that this routine may be implemented as part of the processing of notifications, such as at block 322 of FIG. 6 or block 372 of FIG. 7. When the notification enters the system, an evaluation is made of all the contexts that are currently true, and the most restrictive settings are applied to the notification in accordance with the user's current state. As illustrated in FIG. 10, at decision block 422, a determination is made whether the notification should be muted. If the notification is to be muted, then the routine proceeds to a block 424, where no volume is provided for the notification. If the notification is not to be muted, then the routine proceeds to a decision block 426.

At decision block 426, a determination is made whether the notification should be provided with some percentage but less than full volume. If some percentage volume is to be provided, then the routine proceeds to a block 428, where the notification is played at the specified percentage volume. If a specified percentage volume is not to be provided, then the routine proceeds to a decision block 430.

At decision block 430, a determination is made whether full volume should be provided for the notification. If full volume is to be provided, then the routine proceeds to a block 432, where the notification is played at the full volume level. If full volume is not to be provided, the routine ends. In one embodiment, in addition to providing for different volume levels for the notification, different sounds may also be selected for the notification in accordance with the user context and rules.

It will be appreciated that the user context system as described above with respect to FIGS. 1-10 controls the delivery of notifications from various sources such that the notifications stop conflicting with one another because the system appropriately brokers and serializes their on-screen rendering. In addition, the notifications that are processed by the user context system can be considered to be more valuable because they are delivered when the user is more receptive to them, and in addition the use of common rules helps the user to eliminate undesired notifications.

As described above, the system brokers and serializes the delivery of notifications from multiple sources. In addition, a shared notion of user context is provided for determining the appropriate handling for each of the notifications. In accordance with these aspects, the notifications that are delivered by the system may be considered to be more valuable in that they are delivered when the user is more receptive to them. These aspects also provide for common rules which help the user to eliminate undesirable notifications.

User contexts are declared by the operating system and arbitrary programs. In one embodiment, a user context comprises a condition that may be true or false, and an instruction that is to be followed if the condition is true. For example, a condition might be "when a user is listening to music," for which the instruction might be "deliver notifications on the screen but with no sound." In general, the condition for the user context can be thought of as a state that the system assumes makes the user in some way unavailable for notification delivery or that causes the way that the notification should be delivered to be different from how it was sent by the program that initiated it. The user may be in a state deemed "unavailable" in which case the notification is either not delivered or held until the user becomes "available." For instance, if the user is running a full screen application, where the application is using or being displayed on the full area of a display screen, that user may be deemed unavailable. Or, the user may be "available" but in such a state that the notification needs to be modified to be appropriate for the user.

In addition to the operating system declaring contexts, programs register with the system and declare the context they provide and the impact it has on notifications (as per if drawing on the screen is appropriate and the level of invasiveness that is appropriate for drawing on the screen and whether or not sound is appropriate or at what relative volume sound should be played at) and then tells the system whether the context is true or false. In one embodiment, the context may also be evaluated as true or false at the time that a notification is to be delivered. In one embodiment, the system may also track the process of the calling program, and if the process is no longer present, the context may be reset to false. By tracking the process, certain undesirable situations can be avoided, such as an application declaring a user as being busy, and then crashing, and then leaving the user stuck in a state in which they have been declared as not being available for receiving notifications.

There may be different levels of invasiveness specified for the drawing of notifications. In other words, based on the user context, there may be gradients for the drawing of notifications, such that there may be different levels of invasiveness in the form of the drawn notification. For example, a normal notification may be free to be drawn in the client area and briefly obscure a window. If the user is in a slightly restrictive context, the notification may be free to show, but only in a less invasive manner, such as it might not be allowed to draw on top of another window. As another example, if a user is running a maximized application, the setting may be that the user context is slightly restricted, in that the user has clearly made a statement that they want their current application to get the entire client area. In this circumstance, notifications may still be allowed to draw, but they may be made to only appear within the sidebar. This type of reduced invasiveness in the notification drawing form lessens the impact of the notifications, and lessens the cognitive load.

The contexts that have been provided are exposed to the user and can either be turned off (e.g., the user doesn't agree with the program's assessment of the context) or changed in terms of the impact on delivery. The user may define rules that dictate how notifications that contain specified elements should be delivered. For example, a user rule might dictate that any notifications received from "John Doe" and with "urgent" in the subject line, should be delivered immediately. In one embodiment, such user rules are given precedence over the user contexts. The user rules are made available to the user for modification in accordance with the user's preferences.

FIGS. 11-14 are directed to the evaluation of test notifications. As will be described in more detail below, the test notifications can be utilized by any program to obtain information about the current state of a user context. One advantage of this aspect is that the user context information can be obtained by any program, regardless of whether the program intends to use the service already built in the system, or whether the program is to extend it by rolling its own interpretation of what the notification should look like or the way it should be delivered. In other words, future programs with more advanced notifications that are not designed to be limited by the rendering provided to them by the system will still be able to utilize test notifications to obtain information about the user's current context. Such more advanced notifications are likely to occur as the richness of notifications continues to grow and change, and new user interfaces for notifications continue to develop.

As an example, a future user interface may provide rich full screen animations that draw only when the user is not "busy." For instance, placing a CD into the CD-ROM drive might present an animation of a CD on the screen, while the CD-ROM spins up (due to technical constraints, there is a period of time from when the CD is first inserted until the CD may be read even though it is known to be in the drive—and during this time period an animation could be used to show the user that the system is aware of the CD, but just can't read from it yet). By using the test notifications of the embodiment of the present invention, the animation program will be able to know about the user's current context and can choose to not show on-screen if the user is not receptive to notifications right now.

As another example, a future instant messaging program may develop a new user interface for notifications that could not be done with the current notification engine. The development of such new user interfaces is desirable. Test notifications could continue to be utilized by the instant messaging program to determine whether it should show/not show its more advanced notifications in accordance with user's current context.

The test notifications can also be utilized to prevent unwanted notifications from being generated. This aspect can be applied to any programs that attempt to send notifications to the system. In other words, by enabling a program to have a richer view of the user's context, unwanted notifications can be prevented from being generated by the programs, thus proactively ending the generation of these types of notifications until the user is in a receptive state. The following examples provide further illustrations of this aspect.

As one example, an instant messaging program may provide a list of contacts. The test notifications are able to tap into the context system on a per-contact basis (e.g., "if Tom were to send you an instant message right now, would it show?" and "if Chris were to send you an instant message right now, would that show?"). On the basis of this information, the instant messaging program can begin broadcasting definite busy or free states to individual contacts. This technique could be used to preemptively stop unwanted notifications from being generated, rather than simply suppressing them once they are received.

As another example, if a user is busy, a mail program could make use of this to provide an automated reply to the sender (either to all senders based on rules that the user has provided, such as "my direct reports" or "my manager"). The automated reply could indicate "I am busy right now, but will respond when I have a chance." In general, the communications of the system as a whole can be improved by exposing the user's context to arbitrary programs.

As described above, an application is able to construct a test notification and receive back specifically whether or not an actual notification would draw on the screen at the present time. As noted above, this allows programs to continue to use the user context system even after new user interfaces for notifications are developed. In addition, by enabling these new richer scenarios for other programs, all programs that utilize the system can be considered to be richer and more intelligent based on having increased access to information about the user's behavior and preferences.

Figure 11:
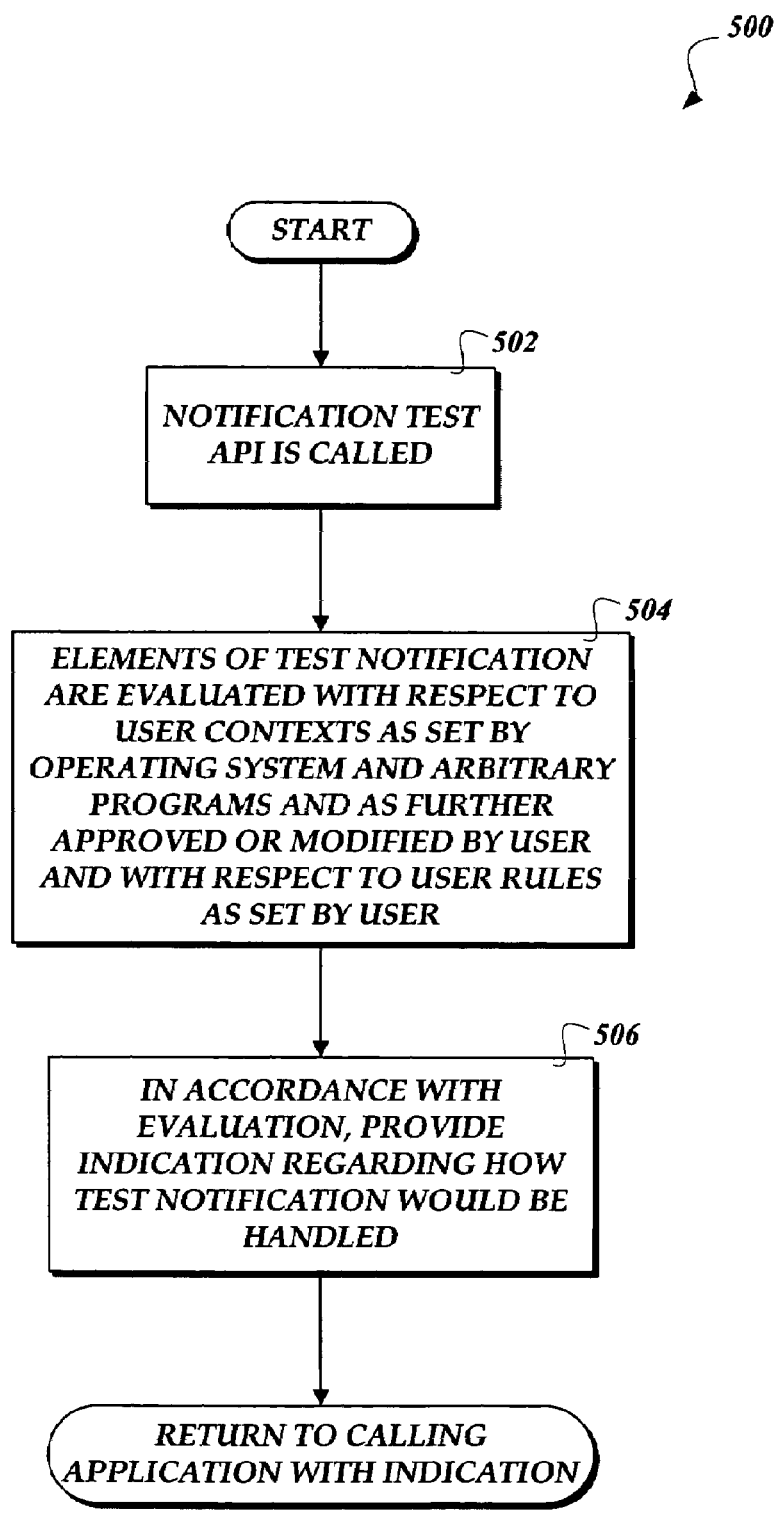
FIG. 11 is a flow diagram illustrative of a general routine for processing a test notification in accordance with the embodiment of the present invention.

FIG. 11 is a flow diagram illustrative of a general routine 500 for processing a test notification. The routine is similar to the routine of FIG. 2 for processing an actual notification. As illustrated in FIG. 11, at a block 502, the notification test API is called. At a block 504, the elements of the test notification are evaluated with respect to the user contexts as set by the operating system and arbitrary programs and as further approved or modified by the user, and with respect to any user rules as set by the user. At a block 506, in accordance with the evaluation of the test notification, an indication is provided regarding how the test notification would be handled. The indication is then returned to the calling application.

In one embodiment, the notification test API is called when the operating system or an arbitrary program decides that it needs to understand how busy the user currently is. One example of when this might occur would be when there is a decision point for whether or not to draw a notification on the screen. Another example would be to use this data to inform an action that the program wants to take on the user's behalf.

When the notification test API is called, the calling program constructs a notification that is as close to what it would send if it were using the notification methods of the user context system for sending an actual notification, and then uses an optional method to test (which returns the result and also guarantees that this particular notification will not be shown on-screen). One example of this process would be an instant messaging program wanting to broadcast an appropriate free or busy state to each contact based on the current user's context. The instant messaging program would create a test notification for each contact, and based on the return value broadcast a different free or busy state on a per-contact basis. Another example would be a program wanting to show an animation based on a user context (e.g., the CD-ROM animation example described above). The code that wants to show the animation would construct a notification (in this case, the contents simply being a simple notification with an image or animation sequence as this is just a test as to whether or not the given notification would draw), and then uses the test method, and then the return results could be used as a guide for whether or not the animation should currently be played. In one embodiment, the calling code will generally at least raise the most-generic notification possible as a test notification. If there is richer data available (such as the contact from the contact list), then including this information makes the test notification more accurate as the user may have custom user rules on a per person basis that may affect the returned results.

One implementation that may be utilized for the notification test API is a polling implementation. In the instant messaging program example described above, for the polling implementation the instant messaging program would periodically re-poll the notification test API to determine how to change the broadcast data. Another implementation that can be utilized for the notification test API is a subscription callback implementation. In this implementation, the instant messaging program would "subscribe" to context changes. Then, rather than periodically re-polling, as the user context changes in ways that change what the instant messaging program would be able to broadcast, the context engine can call back to the instant messaging program with appropriate updates. In some scenarios, this is advantageous, in that there is no lag between the context changes and what is broadcast (whereas with the polling implementation, there will tend to be moments when the broadcast state does not match the current user context). For other scenarios, the polling implementation may be more appropriate (as these are responses to one-time events, e.g., a CD being inserted into a CD-ROM).

Figure 12:
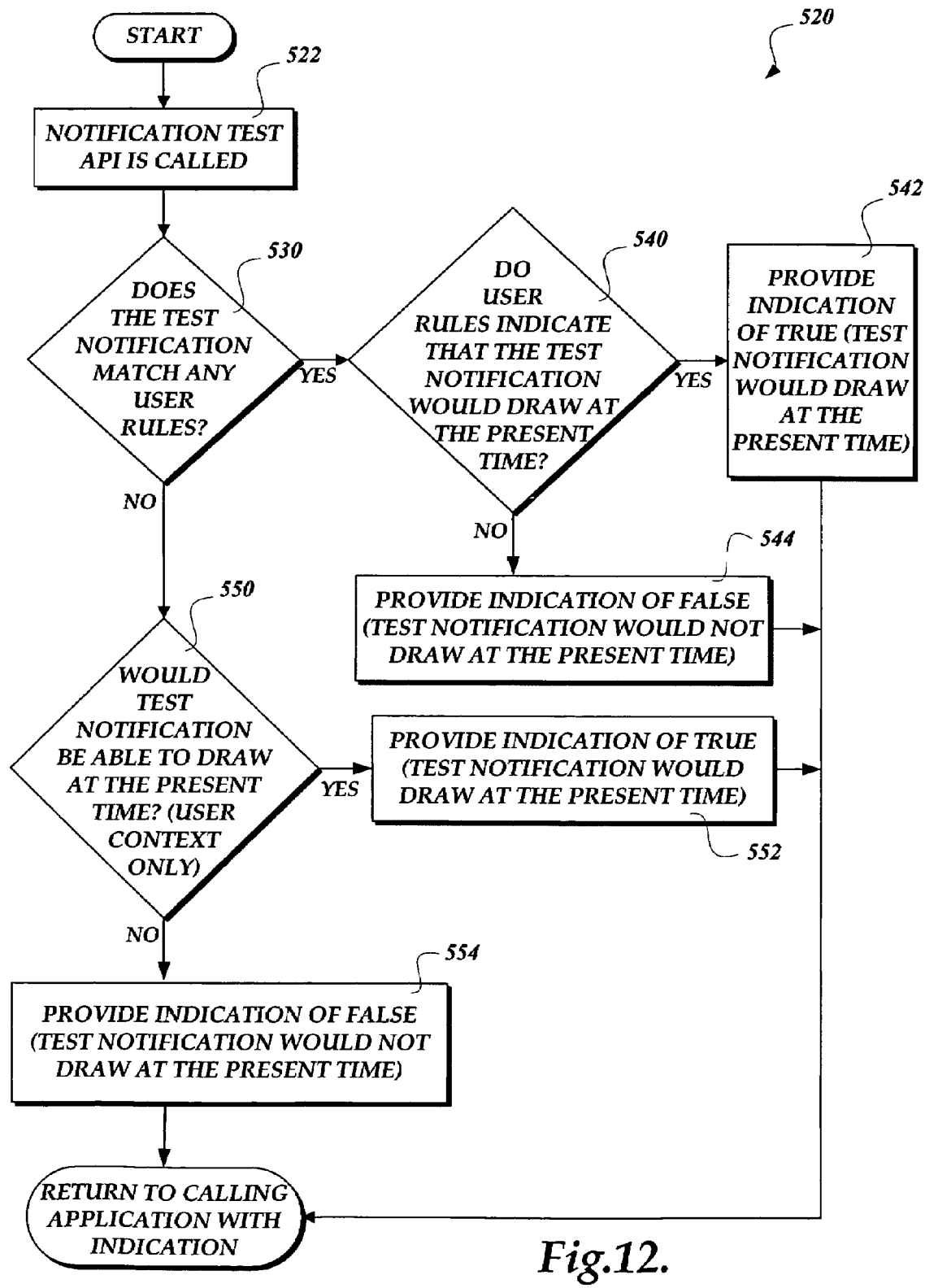
FIG. 12 is a flow diagram illustrative of a routine for processing a test notification and returning indications of true or false.

FIG. 12 is a flow diagram illustrative of a routine 520 for processing a test notification and returning an indication of true or false for whether or not the test notification would draw at the present time. At a block 522, the notification test API is called. At a decision block 530, a determination is made whether the test notification matches any user rules. If the test notification does not match any user rules, then the routine proceeds to a decision block 550, as will be described in more detail below. If the test notification does match any user rules, then the routine proceeds to a decision block 540.

At decision block 540, a determination is made whether the user rules indicate that the test notification would draw at the present time. If the test notification would draw at the present time, then the routine proceeds to a block 542, where an indication of true is provided. If the test notification would not draw at the present time, then the routine proceeds to a block 544, where an indication of false is provided.

At decision block 550, a determination is made whether the test notification would be able to draw at the present time (in relation to the user context only). If the test notification would be able to draw at the present time, then the routine proceeds to a block 552, where an indication of true is provided. If the notification would not be able to draw at the present time, then the routine proceeds to a block 554, where an indication of false is provided. From blocks 542, 544, 552 and 554, the routine returns to the calling application with the designated indication.

Figure 13:
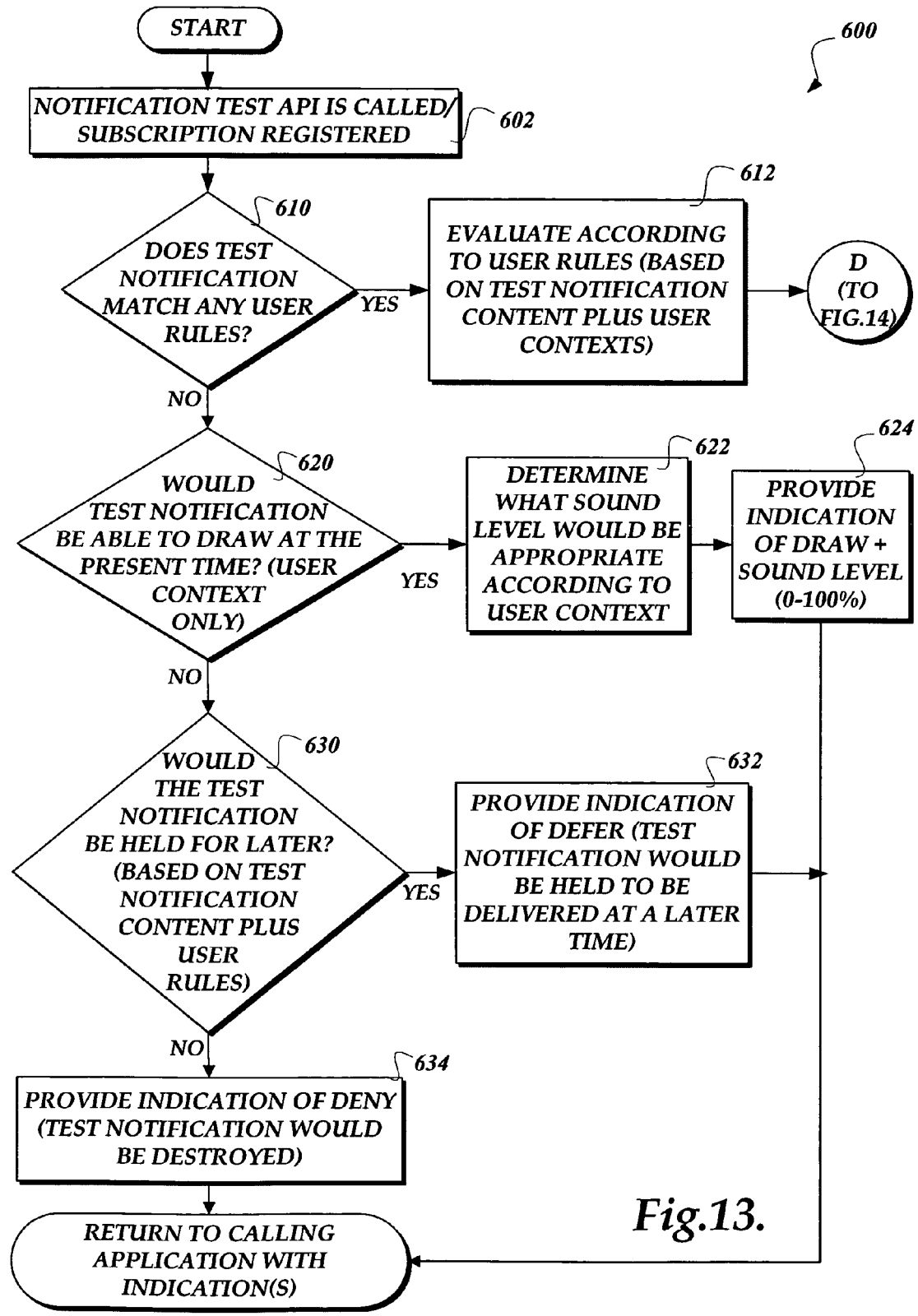
FIG. 13 is a flow diagram illustrative of a routine for processing a test notification and returning indications with full details.

FIG. 13 is a flow diagram illustrative of a routine 600 for processing a notification and returning detailed indications. As noted above, the routine 520 of FIG. 12 only provides a return value with an indication of true or false, with regard to whether or not the notification would draw at the present time.

As will be described in more detail below, the routine 600 of FIG. 13 returns richer return values (e.g., the notification would not draw right now, but it would draw as soon as the user's context changes, or it would route to another device, etc.). This provides for richer logic in the calling code. This allows for advanced functionality in programs that are able to utilize such richer return values.

It should also be noted while the return values are being described as part of a function call, in another embodiment this data may be passed as part of a callback. In other words, the calling application can set up a "subscription" to a notification such that when a user's context subsequently changes (as would affect the delivery of notifications from the calling application) then the calling application is notified. This requires no polling, and in some cases is thus better for the robustness and performance of the system.

As illustrated in FIG. 13, at a block 602 the notification test API is called or a subscription is registered (as related to the polling versus subscription embodiments described above). At a decision block 610, a determination is made whether the test notification matches any user rules. If the test notification does not match any user rules, then the routine proceeds to a decision block 620, as will be described in more detail below. If the test notification does match any user rules, then the routine proceeds to a block 612. At block 612, the test notification is evaluated according to the user rules (based on the test notification content plus the user contexts), and the routine continues to a point D that is continued in FIG. 14, as will be described in more detail below.

At decision block 620, a determination is made whether the test notification would be able to draw at the present time (based on user context only). If the test notification would not be able to draw at the present time, then the routine proceeds to a decision block 630, as will be described in more detail below. If the test notification would be able to draw at the present time, then the routine proceeds to a block 622. At block 622, the routine determines what sound level would be appropriate according to the user context. At a block 624, an indication is provided that the notification would draw, and also including the percentage sound level that would be appropriate for the notification.

At decision block 630, the determination is made whether the test notification would be held for later delivery (based on the test notification content plus the user rules). If the test notification would be held for later, then the routine proceeds to a block 632 where an indication is provided of defer. If the test notification would not be held for later delivery, then the routine proceeds to a block 634, where an indication is provided of deny. From blocks 624, 632 and 634, the routine returns to the calling application with the specified indication(s).

Figure 14:
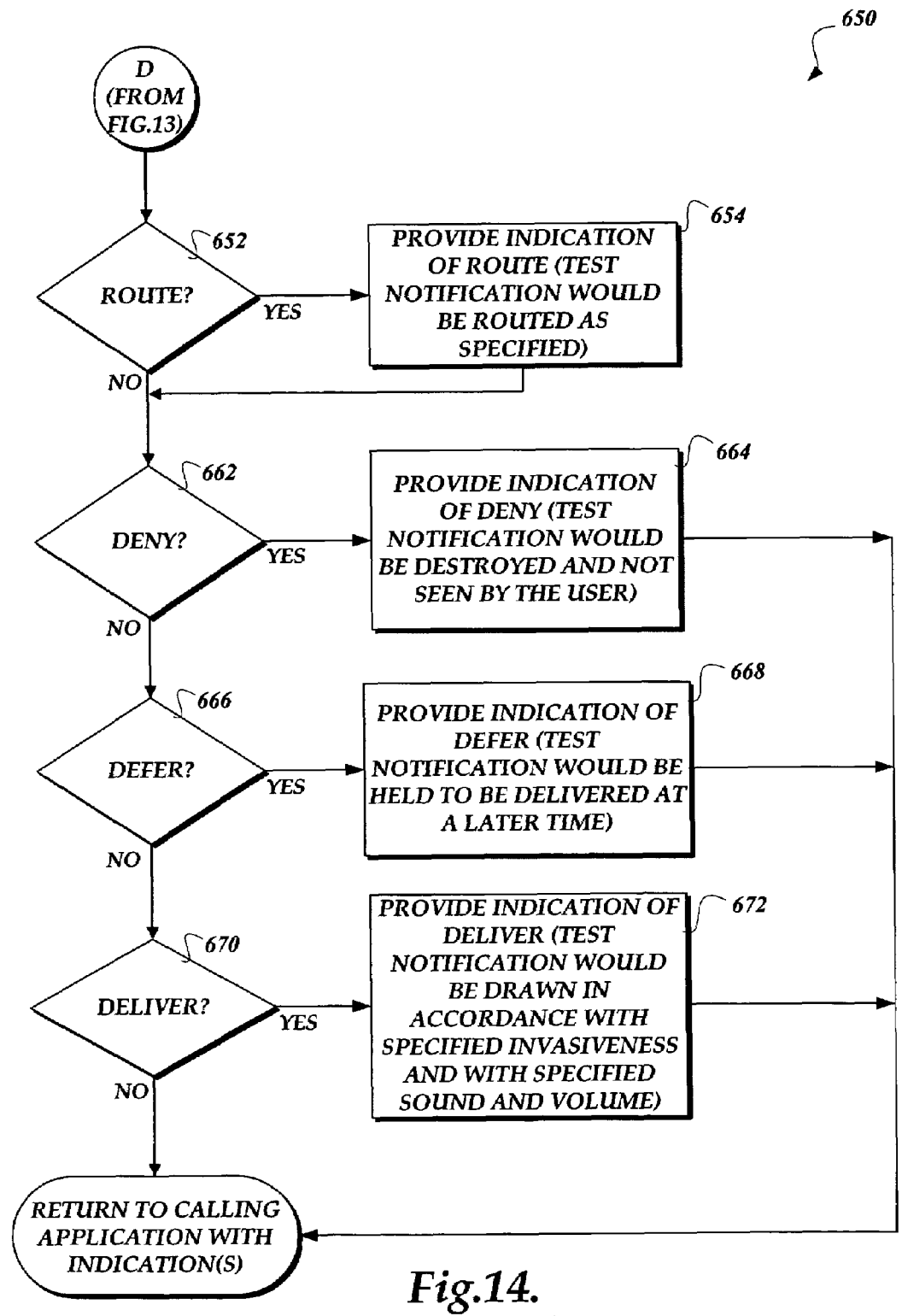
FIG. 14 is a flow diagram illustrative of a routine for utilizing user rules to process a test notification based on the test notification's content and the current user contexts.

FIG. 14 is a flow diagram illustrative of a routine 650 for evaluating a test notification in accordance with user rules. The routine continues from a point D from FIG. 13. As illustrated in FIG. 14, at a decision block 652, a determination is made whether the test notification should be routed. If the test notification is to be routed, then the routine proceeds to a block 654 where an indication of route is provided, and the routine proceeds to a decision block 662. If the test notification would not be routed, the routine also proceeds to decision block 662.

At decision block 662, a determination is made whether the test notification would be denied. If the test notification would be denied, then the routine proceeds to a block 664, where an indication of deny is provided. If the test notification would not be denied, then the routine proceeds to a decision block 666.

At decision block 666, a determination is made whether the test notification would be deferred. If the test notification would be deferred, then the routine proceeds to a block 668, where an indication is provided of defer. If the test notification would not be deferred, then the routine proceeds to a decision block 670.

At decision block 670, a determination is made whether the test notification would be delivered. If the test notification would be delivered, then the routine proceeds to a block 672, where an indication of deliver is provided. In one embodiment, the delivery indication may also include a specified invasiveness indication as well as a sound and volume indication. If the test notification would not be delivered, then the routine returns to the calling application. From blocks 664, 668, and 672, the routine returns to the calling application with the specified indications.

It will be appreciated that FIGS. 11-14 illustrate a system and method utilizing test notifications which enable programs to obtain indications as to the availability of a user. By enabling a program to have a richer view of a user's context, the generation of unwanted notifications can be prevented at the source, thus allowing notifications to only be generated when a user is in a receptive state. In addition, a program is able to utilize the test notifications to determine a user's context, even if the program generally utilizes a different user interface for its own notifications. These aspects allow for greater flexibility in the potential uses of the user context system. These aspects also enable new richer scenarios for other programs, such that the system as a whole can become richer and more intelligent based on the user's behavior and preferences.

FIGS. 15A and 15B are diagrams illustrative of pseudo code 1500A and 1500B for a notifications API. As shown in FIG. 15A, the pseudo code 1500A includes portions 1510-1550. The portion 1510 relates to an object for sending a balloon notification to the user. This class can be derived if there is a need to add custom properties to the object so as to have more context when a NotificationClickedEvent arrives.

The portion 1520 relates to the icon for sending the notification. In one embodiment, minimum and maximum sizes are specified (e.g., in one example a minimum size is 16×16 and a maximum size is 80×80). The portion 1530 relates to the title text for the notification. The portion 1540 relates to the main BodyText for the notification. The portion 1550 relates to a property that should be set as True if the user is to be able to click inside the notification to trigger some event.

As shown in FIG. 15B, the continuation of the pseudo code 1500B includes portions 1560-1590. The portion 1560 relates to a method that is to be called after the setting of all the relevant notification properties when the notification is ready to be sent so that it will be shown to the user. This method returns immediately. The portion 1570 relates to updating a notification that has already been sent. After some properties are changed, the update may be called to have the changes reflected. The portion 1580 relates to a call for determining whether a particular notification would actually draw on the screen the present time. The portion 1590 relates to a call for recalling a notification that was already sent, but that has since become obsolete.

FIG. 16 is a diagram illustrative of pseudo code 1600 for a context setting API. The pseudo code 1600 includes portions 1610-1630. The portion 1610 notes that this class helps manage context changes. In one embodiment, the custom contexts are defined in an application manifest. This class allows a context to be set as True, or reset to False. An example of context is the FullScreen context (which in one embodiment is managed by the operating system) which is True when any application is full screen. In one embodiment, the default value for any context is always False. The portion 1620 relates to constructing a context object for a particular context, as identified by its GUID. The portion 1630 relates to changing the value of a context. In one embodiment, all of the contexts for an application will be reset to False when the application terminates or dies.

Figure 17:
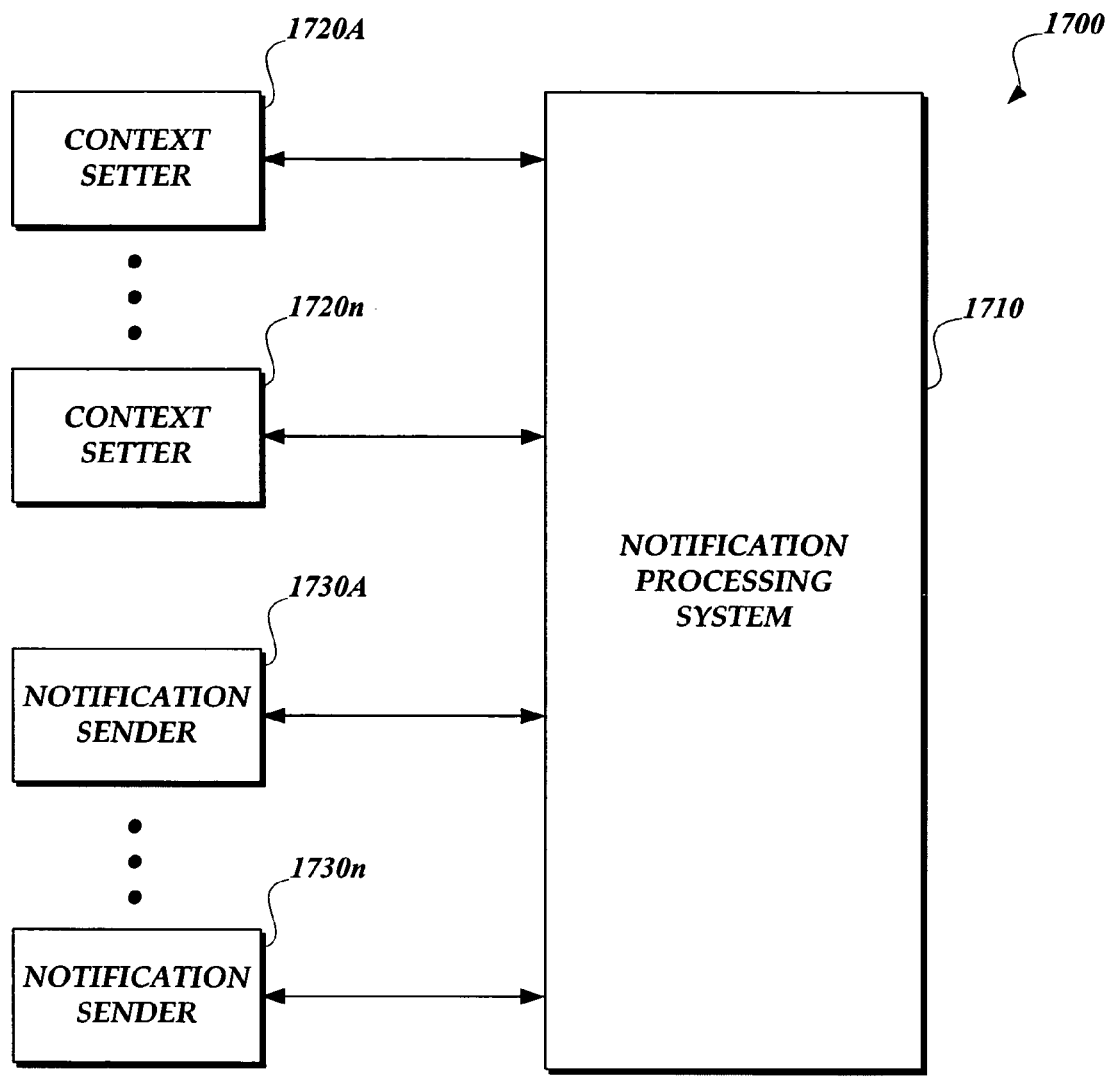
FIG. 17 is a block diagram illustrating a notification processing system which receives inputs from context setters and notification senders.

FIG. 17 is a block diagram of a notification system 1700. The notification system 1700 includes a notification processing system 1710, context setters 1720A-1720n and notification senders 1730A-1730n. As described above, the context setters 1720A-1720n communicate with the notification processing system 1710 such that a context setting API is called by which context setters declare default contexts and their impact on the user's busy state, and also set already declared contexts as true or false, which are then added to the user contexts. As also described above, the notification senders 1730A-1730n communicate with the notification processing system 1710 such that the notification API is called, and the elements of the notifications are evaluated with respect to the user contexts as set by the context setters 1720A-1720n and as further approved or modified by the user and with respect to the user rules as set by the user. Then, in accordance with the evaluation, the notifications are delivered, deferred, denied, routed or otherwise handled.

Figure 18:
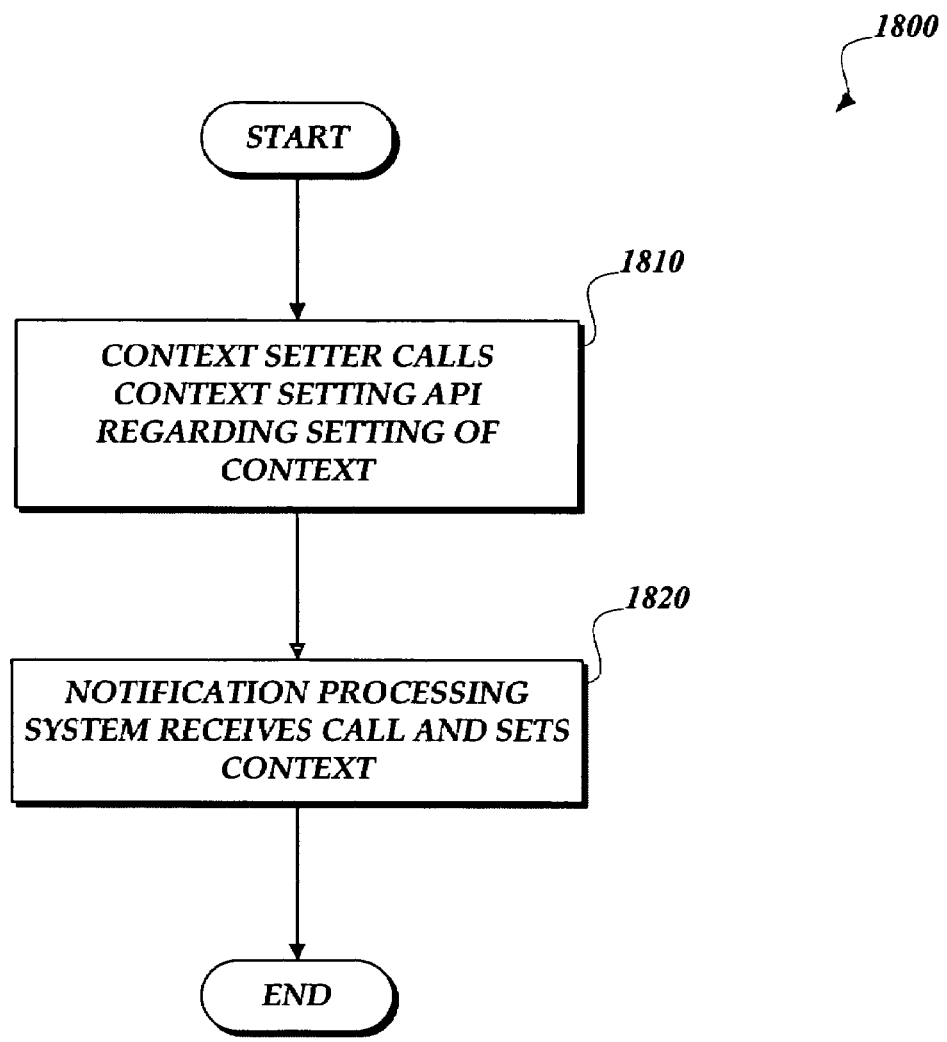
FIG. 18 is a flow diagram illustrative of a general routine for calling a notification API.

FIG. 18 is a flow diagram illustrative of a general routine 1800 by which a context setting API is called. At a block 1810, a context setter calls the context setting API regarding the setting of the context. At a block 1820, the notification processing system receives the call and the context is set. As described above, the context setters declare their default contexts and their impact on the user's busy state. The context setters set an already declared context as true or false, which are then added to the user contexts.

Figure 19:
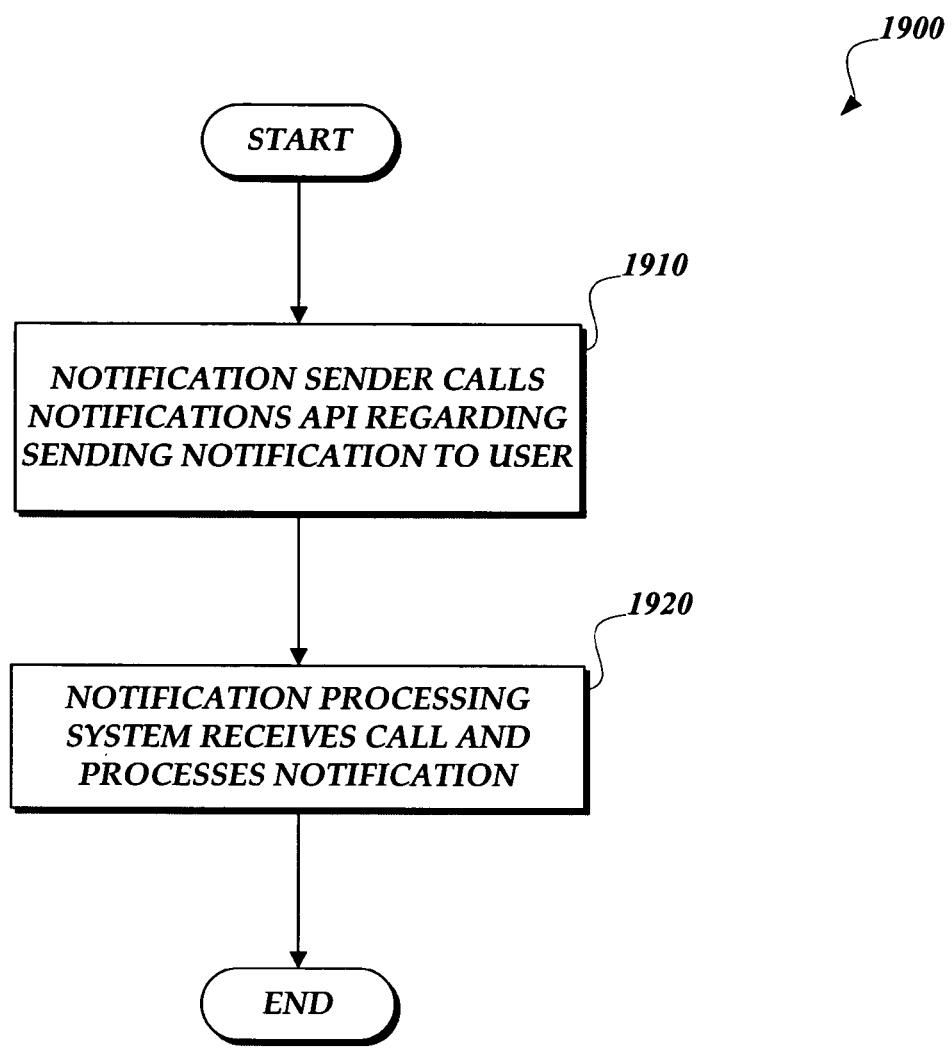
FIG. 19 is a flow diagram illustrative of a general routine for calling a context setting API.

FIG. 19 is a flow diagram illustrative of a general routine 1900 by which a notification API is called. At a block 1910, a notification sender calls the notifications API regarding sending a notification to a user. At a block 1920, the notification processing system receives the call and processes the notification. As described above, once the notification API is called, the elements of the notification are evaluated with respect to the user contexts as set by the context setters and as further approved or modified by the user and with respect to the user rules as set by the user. Then, in accordance with the evaluation, the notification is delivered, deferred, denied, routed or otherwise handled.

The notification system utilizes various programming interfaces. As will be described in more detail below with respect to FIGS. 20A-20L, a programming interface (or more simply, interface) such as that used in the notification system may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 20A:
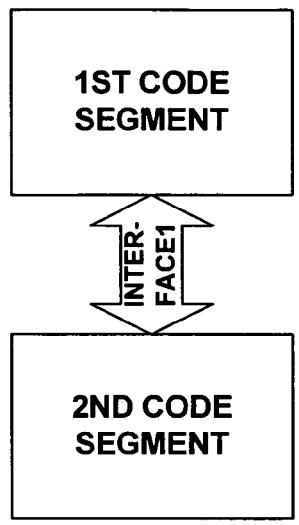
FIGS. 20A-20L are block diagrams illustrating various implementations of a programming interface that may be utilized in a notification system.
Figure 20B:
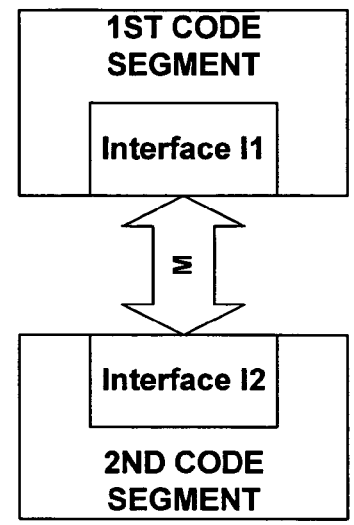

Notionally, a programming interface may be viewed generically, as shown in FIG. 20A or FIG. 20B. FIG. 20A illustrates an interface Interface 1 as a conduit through which first and second code segments communicate. FIG. 20B illustrates an interface as comprising interface objects I1 and I2 (which may or may not be part of the first and second code segments), which enable first and second code segments of a system to communicate via medium M. In the view of FIG. 20B, one may consider interface objects I1 and I2 as separate interfaces of the same system and one may also consider that objects I1 and I2 plus medium M comprise the interface. Although FIGS. 20A and 20B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing description. There are, however, other ways to implement a programming interface, and, unless expressly excluded, these too are intended to be encompassed by the claims set forth at the end of this specification. Such other ways may appear to be more sophisticated or complex than the simplistic view of FIGS. 20A and 20B, but they nonetheless perform a similar function to accomplish the same overall result. We will now briefly describe some illustrative alternative implementations of a programming interface.

Figure 20C:
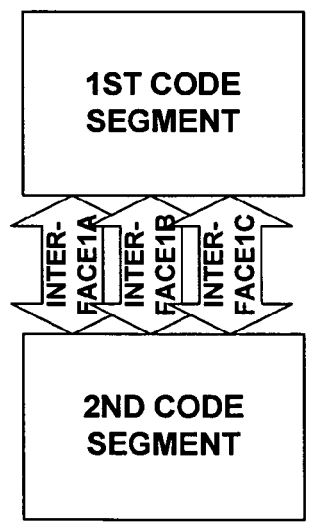
Figure 20D:
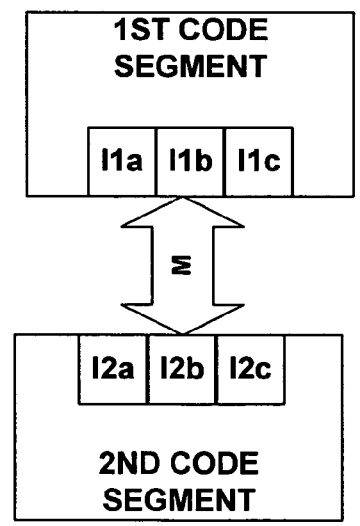

FIGS. 20C and 20D illustrate a factoring implementation. In accordance with a factoring implementation, a communication from one code segment to another may be accomplished indirectly by breaking the communication into multiple discrete communications. This is depicted schematically in FIGS. 20C and 20D. As shown, some interfaces can be described in terms of divisible sets of functionality. Thus, the interface functionality of FIGS. 20A and 20B may be factored to achieve the same result, just as one may mathematically provide 24, or 2 times 2 time 3 times 2. Accordingly, as illustrated in FIG. 20C, the function provided by interface Interface 1 may be subdivided to convert the communications of the interface into multiple interfaces Interface 1A, Interface 1B, Interface 1C, etc. while achieving the same result. As illustrated in FIG. 20D, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 20C and 20D, the functional spirit of interfaces Interface 1 and I1 remain the same as with FIGS. 20A and 20B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Figure 20E:
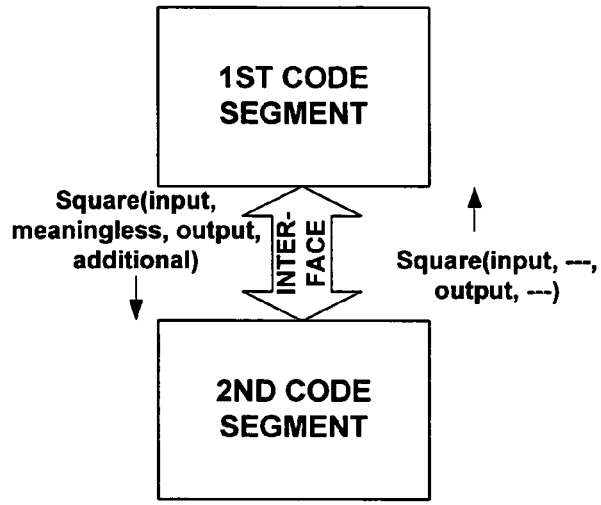
Figure 20F:
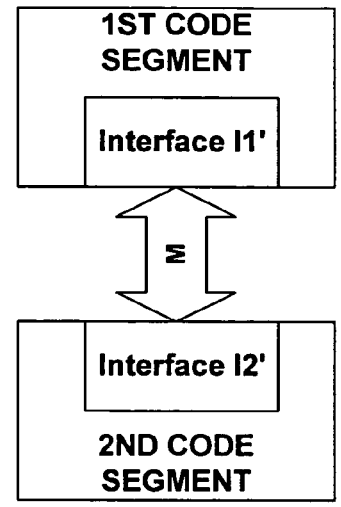

FIGS. 20E and 20F illustrate a redefinition implementation. In accordance with a redefinition implementation, in some cases, it may be possible to ignore, add or redefine certain aspects (e.g., parameters) of a programming interface while still accomplishing the intended result. This is illustrated in FIGS. 20E and 20F. For example, assume interface Interface 1 of FIG. 20A includes a function call Square(input, precision, output), a call that includes three parameters, input, precision and output, and which is issued from the 1st Code Segment to the 2nd Code Segment. If the middle parameter precision is of no concern in a given scenario, as shown in FIG. 20E, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 20F, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

Figure 20G:
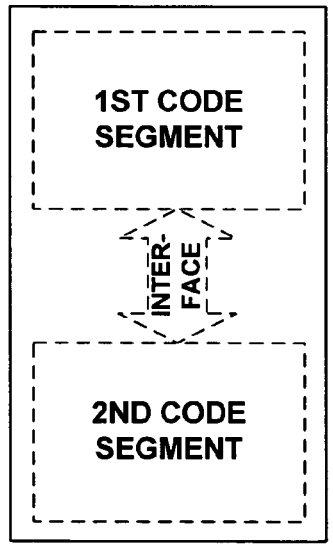
Figure 20H:
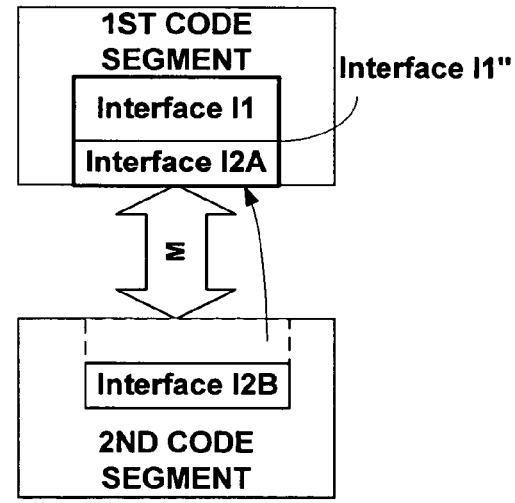

FIGS. 20G and 20H illustrate an inline coding implementation. In accordance with an inline coding implementation, it may also be feasible to merge some or all of the functionality of two separate code modules such that the "interface" between them changes form. For example, the functionality of FIGS. 20A and 20B may be converted to the functionality of FIGS. 20G and 20H, respectively. In FIG. 20G, the previous 1st and 2nd Code Segments of FIG. 20A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface 1 may still be in effect. Similarly, shown in FIG. 20H, part (or all) of interface I2 from FIG. 20B may be written inline into interface I1 to form interface I1". As illustrated, interface I2 is divided into 12a and 12b, and interface portion I2a has been coded in-line with interface I1 to form interface I1". For a concrete example, consider that the interface I1 from FIG. 20B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

Figure 20I:
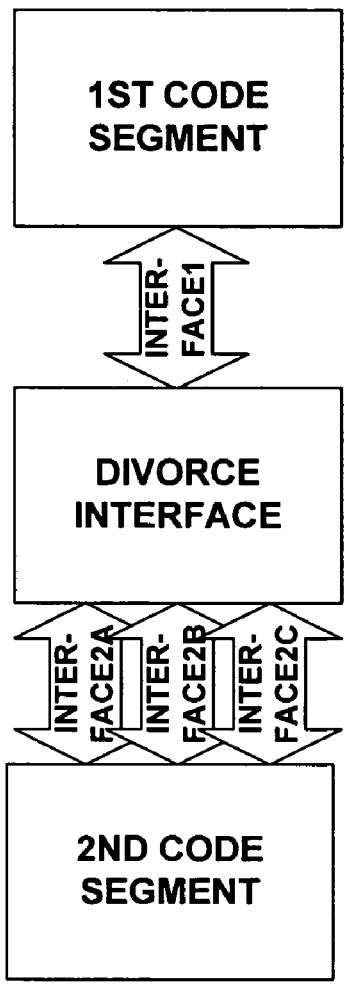
Figure 20J:
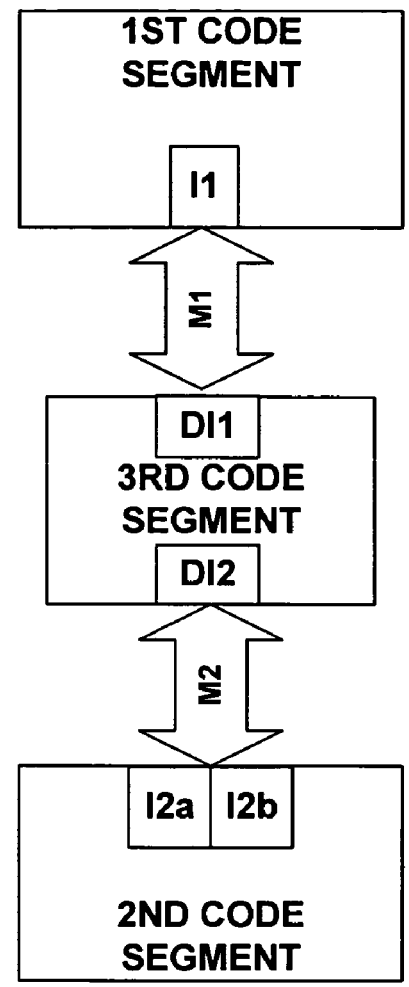

FIGS. 20I and 20J illustrate a divorce implementation. In accordance with a divorce implementation, a communication from one code segment to another may be accomplished indirectly by breaking the communication into multiple discrete communications. This is depicted schematically in FIGS. 20I and 20J. As shown in FIG. 20I, one or more piece(s) of middleware (Divorce Interface(s), since they divorce functionality and/or interface functions from the original interface) are provided to convert the communications on the first interface, Interface 1, to conform them to a different interface, in this case interfaces Interface 2A, Interface 2B and Interface 2C. This might be done, e.g., where there is an installed base of applications designed to communicate with, say, an operating system in accordance with an Interface 1 protocol, but then the operating system is changed to use a different interface, in this case interfaces Interface 2A, Interface 2B and Interface 2C. The point is that the original interface used by the 2nd Code Segment is changed such that it is no longer compatible with the interface used by the $1^{st}$ Code Segment, and so an intermediary is used to make the old and new interfaces compatible. Similarly, as shown in FIG. 20J, a third code segment can be introduced with divorce interface DI1 to receive the communications from interface I1 and with divorce interface D I2 to transmit the interface functionality to, for example, interfaces I2a and I2b, redesigned to work with D I2, but to provide the same functional result. Similarly, D I1 and D I2 may work together to translate the functionality of interfaces I1 and I2 of FIG. 20B to a new operating system, while providing the same or similar functional result.

Figure 20K:
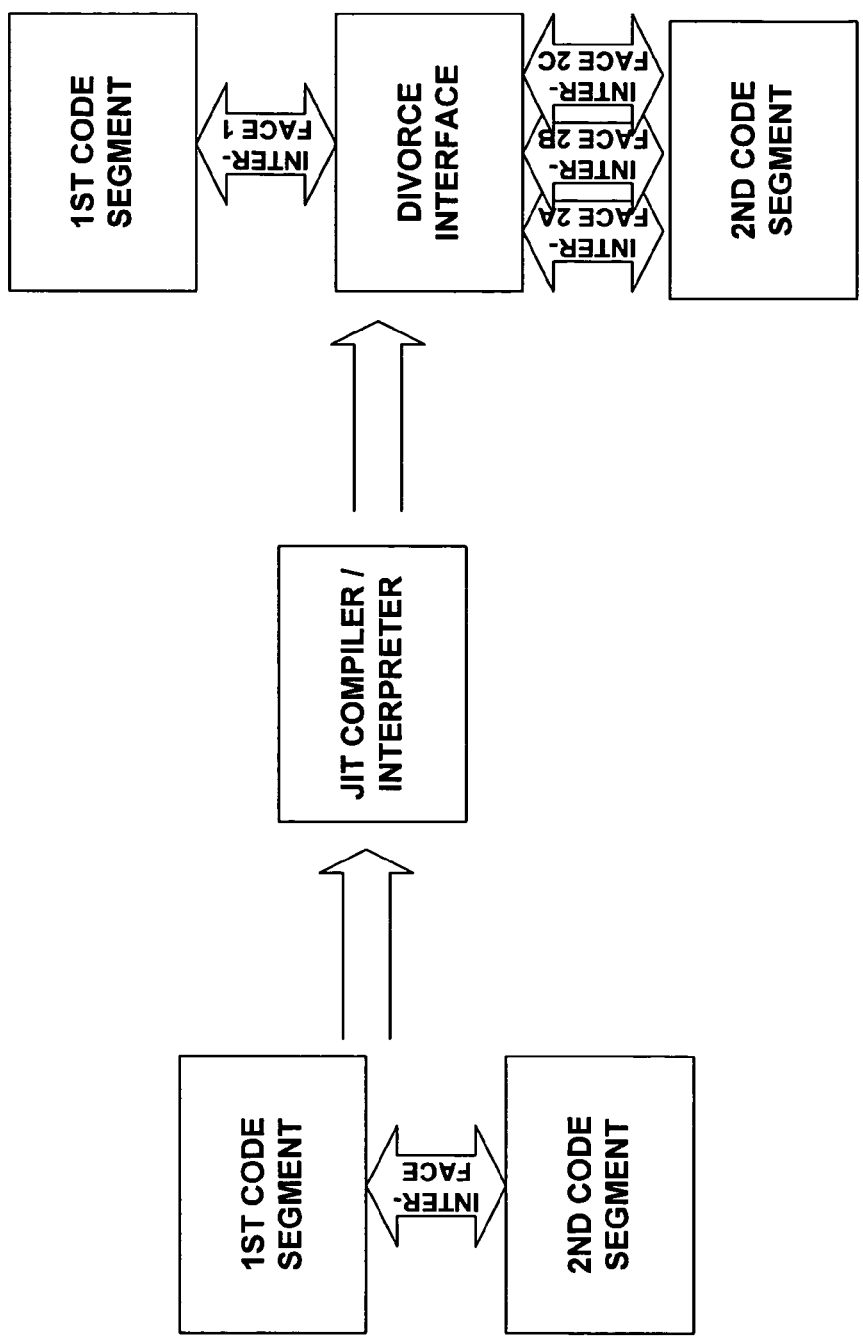
Figure 20L:
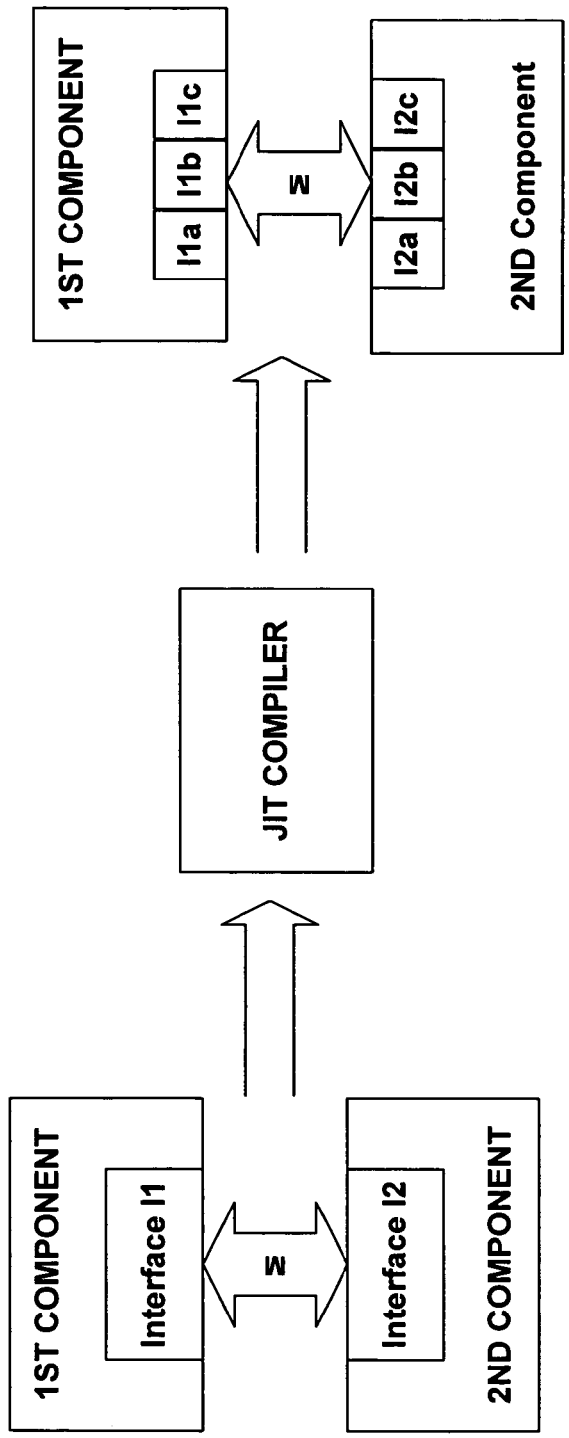

FIGS. 20K and 20L illustrate a rewriting implementation. In accordance with a rewriting implementation, yet another possible variant is to dynamically rewrite the code to replace the interface functionality with something else but which achieves the same overall result. For example, there may be a system in which a code segment presented in an intermediate language (e.g., Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 20K and 20L. As can be seen in FIG. 20K, this approach is similar to the divorce configuration described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 20L, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 20A and 20B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

FIGS. 21-28 are directed to a system and method for public consumption of communication events between arbitrary processes. As discussed above, the notification user context system focuses on when it is appropriate or not appropriate to interrupt a user with a notification based on the user's context. As will be discussed in more detail below, notification mechanisms may be provided for a process to gain insight into when such notification events are occurring, specifically targeting communication-type events, and allowing the processes to act on these events on the user's behalf. By utilizing these mechanisms, rather than requiring a user to personally respond in real time to incoming notifications, the user may instead set a simple white list or other means of identifying people important to the user, and the mechanisms may then provide these people with insights into when the user will be more available for communication. For example, one process that might register to be informed when communication events occur could be a calendaring-type program. The calendaring-type program may have domain knowledge of the user's activities outside of the data that the notification system has (e.g., that the user is scheduled to be giving a presentation during selected times of the day). When a notification comes in and is denied because the user is currently busy, the calendaring program may be provided with a copy of the notification and the fact that it was not delivered, and can evaluate whether or not the sender of the notification is important enough to receive a customized announcement. If the sender of the notification is important enough, a customized announcement might be sent such as "the user you are trying to contact is giving a presentation right now, but if you contact him at time x, you will likely be successful as his calendar is free then." In this scenario, it will be appreciated that the notification system is able to act to effectively broker a user's communications, and thus acts as a type of automated assistant for the user.

Figure 21:
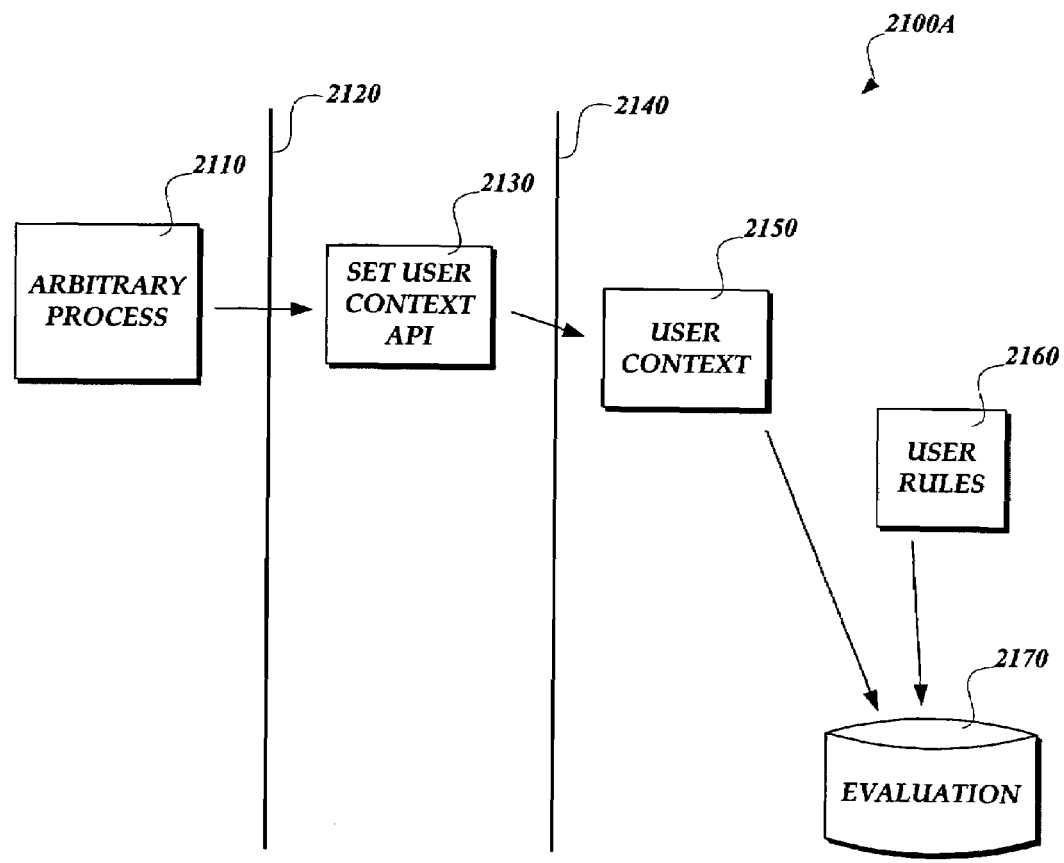
FIG. 21 is a diagram illustrating the setting of a user context and user rules.

FIG. 21 is a diagram of a system 2100A illustrating the setting of a user context and user rules. As shown in FIG. 21, an arbitrary process 2110 communicates across process boundaries 2120 and 2140 in order to set a user context 2150. More specifically, the arbitrary process 2110 utilizes a set user context API 2130 in order to set the user context 2150. The user context 2150 and a set of user rules 2160 are provided to an evaluation component 2170, as will be described in more detail below.

Figure 22:
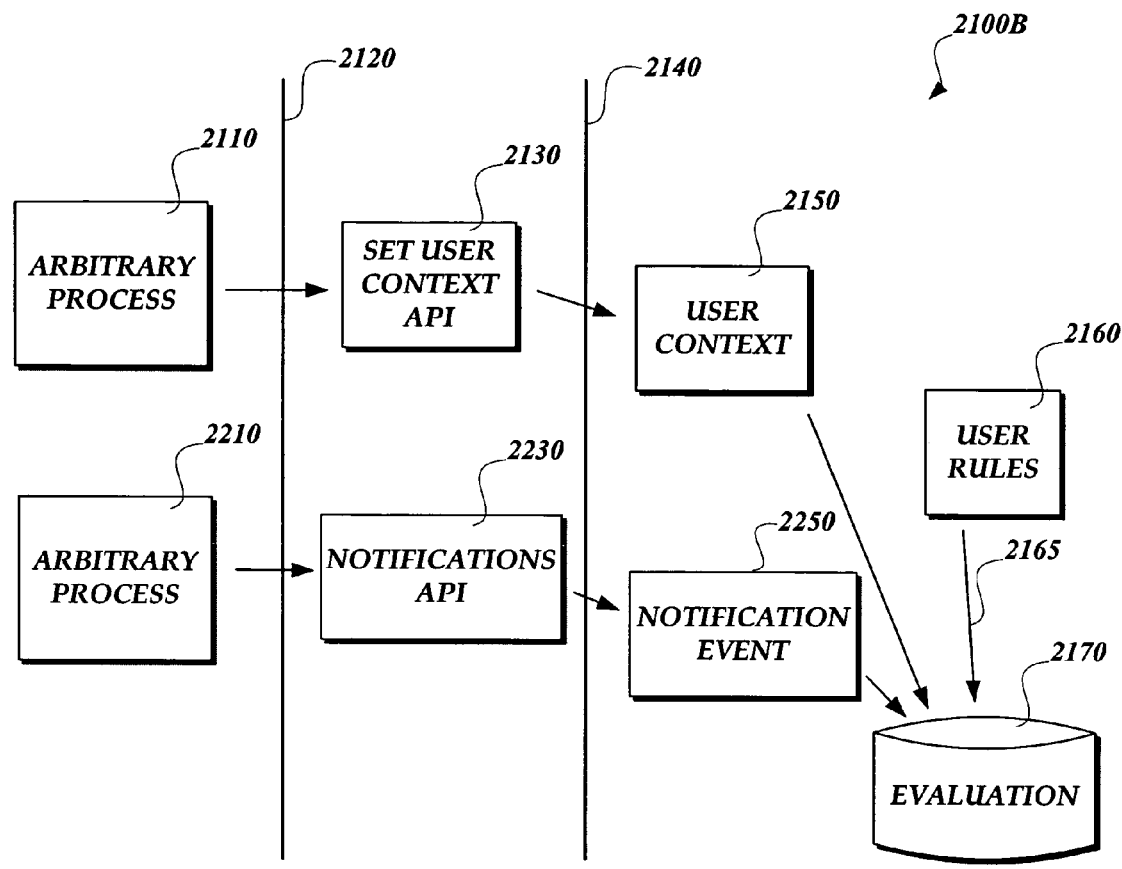
FIG. 22 is a diagram illustrating the initiation of a notification event.

FIG. 22 is a diagram of a system 2100B illustrating the initiation of a notification event. As shown in FIG. 22, an arbitrary process 2210 utilizes a notifications API 2230 to create a notifications event 2250. For example, the arbitrary process 2210 may be sending the user a notification from another person. The arbitrary process 2210 may be any kind of communication program, such as e-mail, instant messaging, a telephone program, etc. As will be described in more detail below, the evaluation component 2170 evaluates the notification event 2250 in accordance with the user context 2150 and the user rules 2160. In one example, the evaluation component 2170 may determine that the user is busy, in which case the notification may fail. In another example, the user may not be busy, in which case the notification may be drawn, as will be described in more detail below with reference to FIG. 23.

Figure 23:
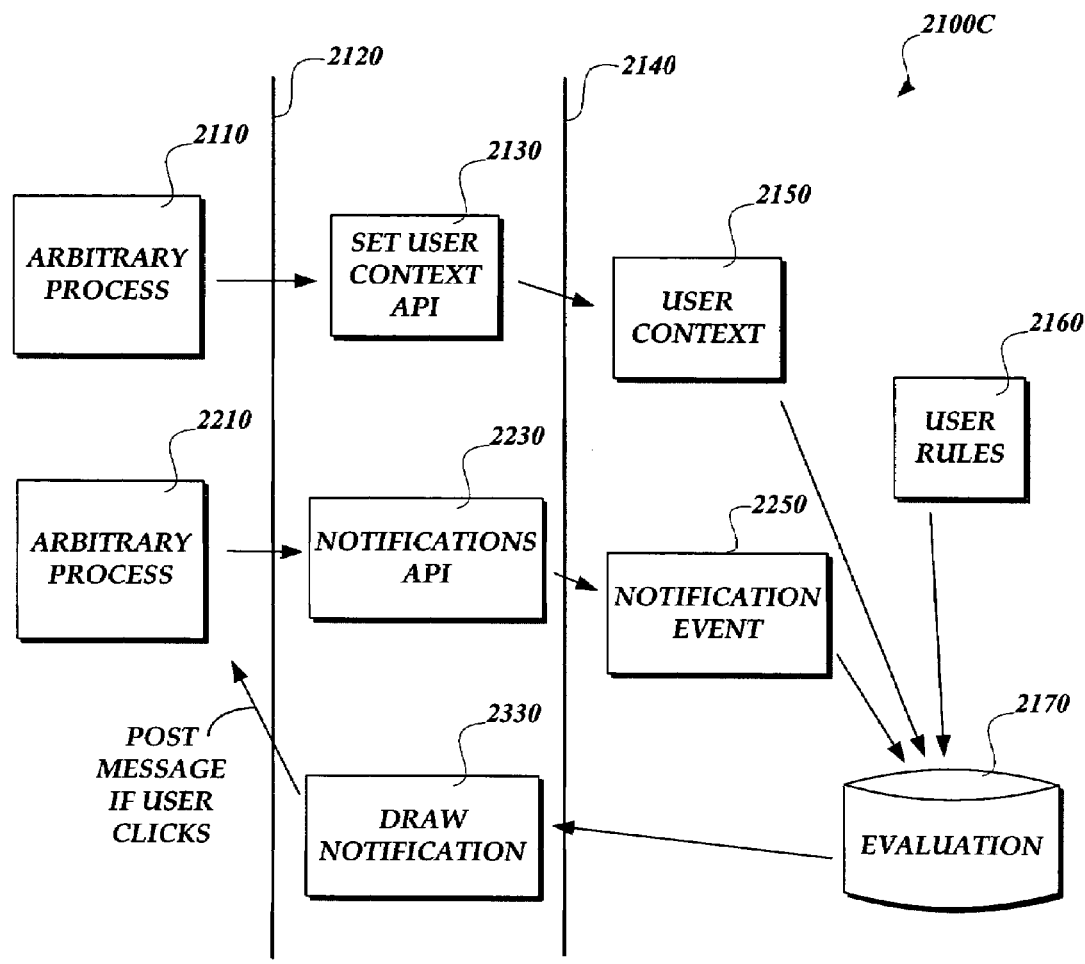
FIG. 23 is a diagram illustrating the drawing of a notification in response to a notification event.

FIG. 23 is a diagram of a system 2100C illustrating the drawing of a notification. As shown in FIG. 23, the evaluation component 2170 considers the user context 2150, the user rules 2160 and the notification event 2250, and determines that it is appropriate to draw a notification 2330. If the user then clicks on the notification, the notification message will be posted for the user.

As an example of a scenario in which a notification would not be drawn (e.g., the user is busy such that a notification fails), in one circumstance the arbitrary process 2110 may be running in full screen. The user context 2150 would thus indicate to the notification system that the user is currently not available to interruption. For example, the user may be giving a presentation or may be otherwise fully occupied such that drawing anything on the screen would currently be inappropriate. Alternatively, if the user is available, then the user context 2150 will so indicate.

Figure 24:
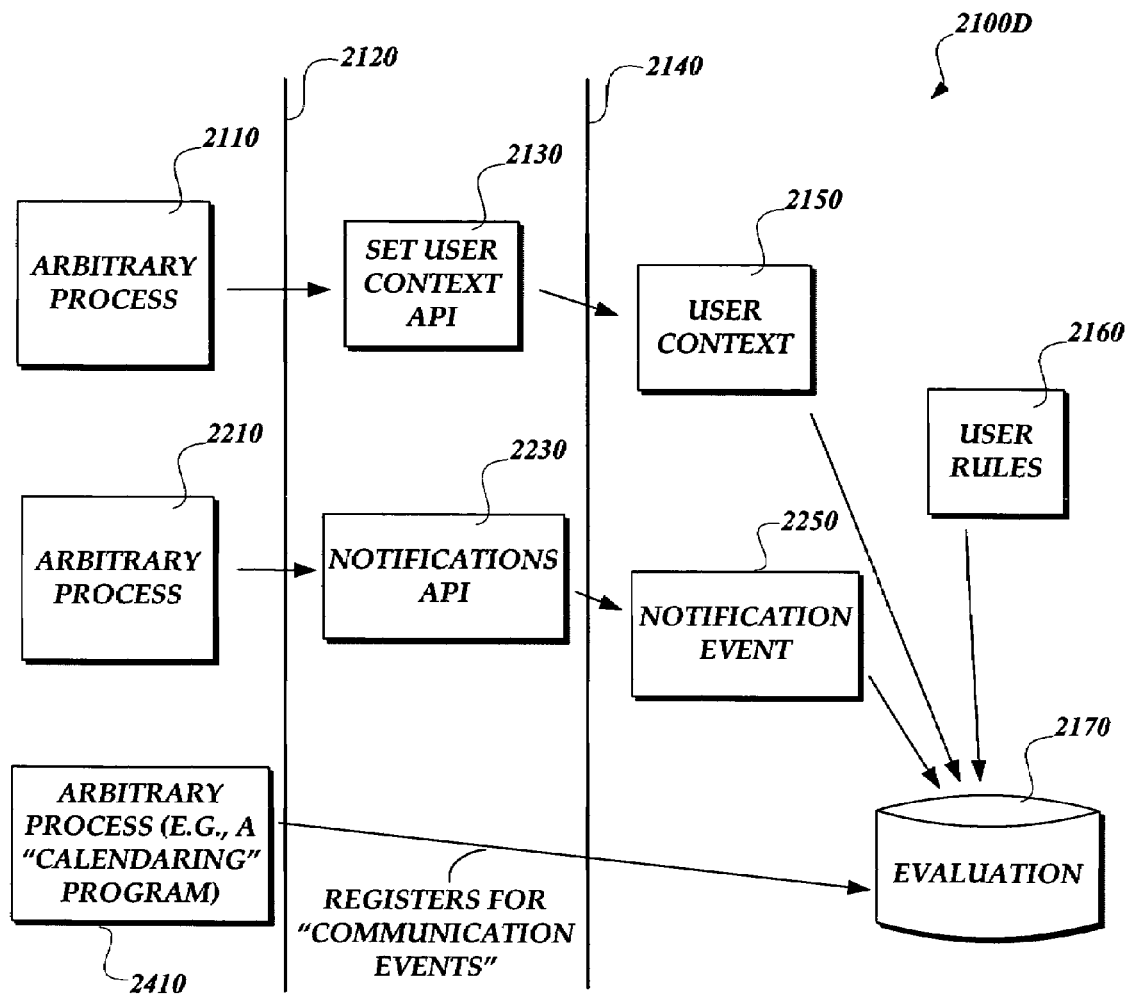
FIG. 24 is a diagram illustrating an arbitrary process registering for communication events.

FIG. 24 is a diagram of a system 2100D illustrating a process that is registering for communication events. As shown in FIG. 24, an arbitrary process 2410 communicates with the evaluation component 2170 so as to register for communication events. In one example, the arbitrary process 2410 may be a program that has some domain knowledge of the user's activities outside of the data that the notification system has. For example, the arbitrary process 2410 might be a type of calendaring program that could have knowledge of what activities the user is currently engaged in (e.g., that the user is scheduled to be giving a presentation during selected times of the day). As will be described in more detail below, the process 2410 may thus be able to include information in any reply that it sends that may indicate what the user is currently doing, when the user will be free, and any appropriate alternate contacts that the person who initiated the communication may follow up with. For example, the busy reply may indicate that the user is more likely to be available at a time x when his calendar is free, or that certain alternate contacts may be appropriate to follow up with.

Figure 25:
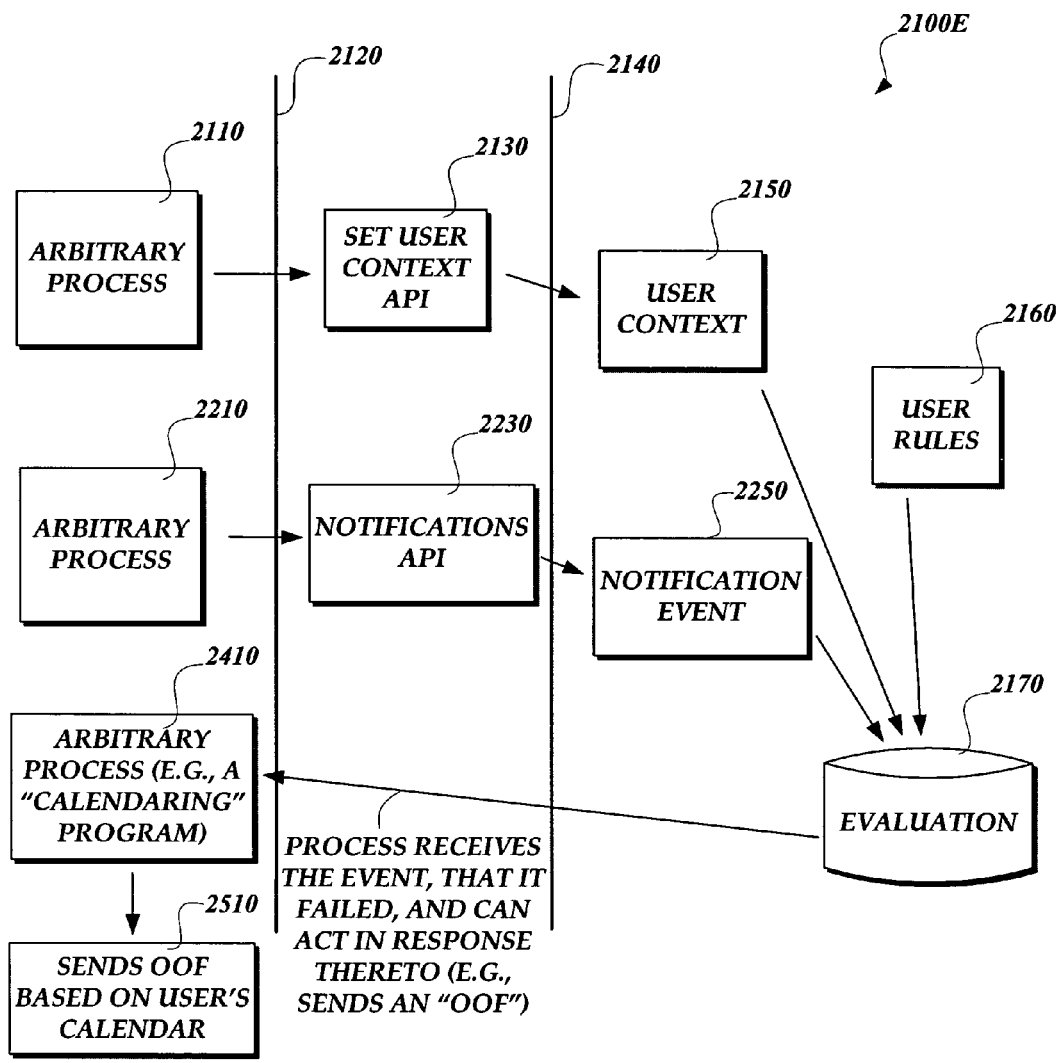
FIG. 25 is a diagram illustrating an arbitrary process receiving a communication event and in response thereto sending a customized announcement.

FIG. 25 is a diagram of a system 2100E illustrating a process receiving a communication event and providing a customized announcement in response thereto. As shown in FIG. 25, the evaluation component 2170 has determined that the user is busy and that the notification therefore fails. The evaluation component 2170 then provides this information, along with a copy of the notification, to the arbitrary process 2410. In response to this information, the arbitrary process 2410 sends an OOF message 2510 based on the user's calendar. More specifically, the arbitrary process 2410 has evaluated the sender of the notification (using whatever heuristics have been selected) and determined that the sender is important enough to the user to receive a customized announcement. For example, the customized busy announcement could state "the user you are trying to contact is giving a presentation right now, but if you try and contact him at time x, you will likely be successful as his calendar is free then."

Figure 26:
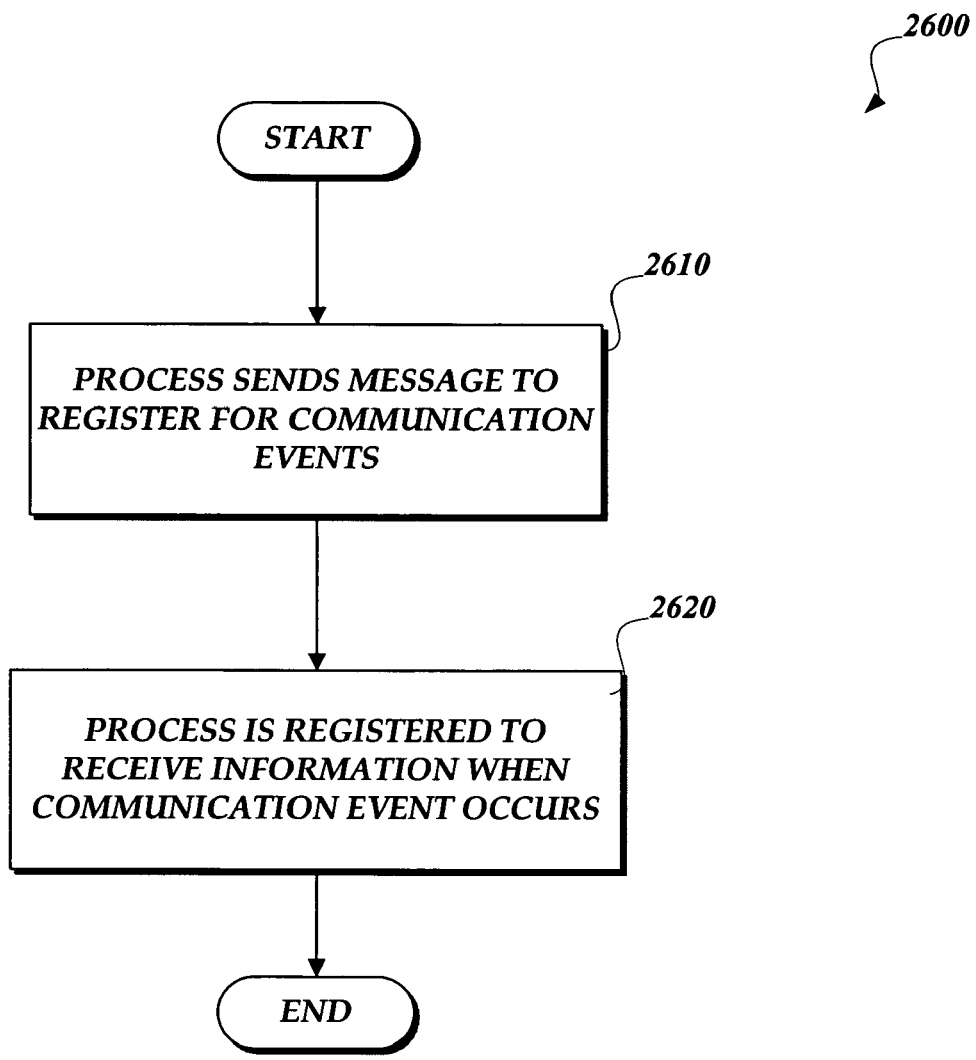
FIG. 26 is a flow diagram illustrative of a general routine for a process registering for communication events.

FIG. 26 is a diagram illustrative of a general routine 2600 for a process registering for communication events. At a block 2610, the process component sends a message so as to register for communication events. At a block 2620, the process is registered to receive information when communication events occur. As described above, this corresponds in FIG. 24 to the arbitrary process 2410 registering for communication events with the evaluation component 2170.

Figure 27:
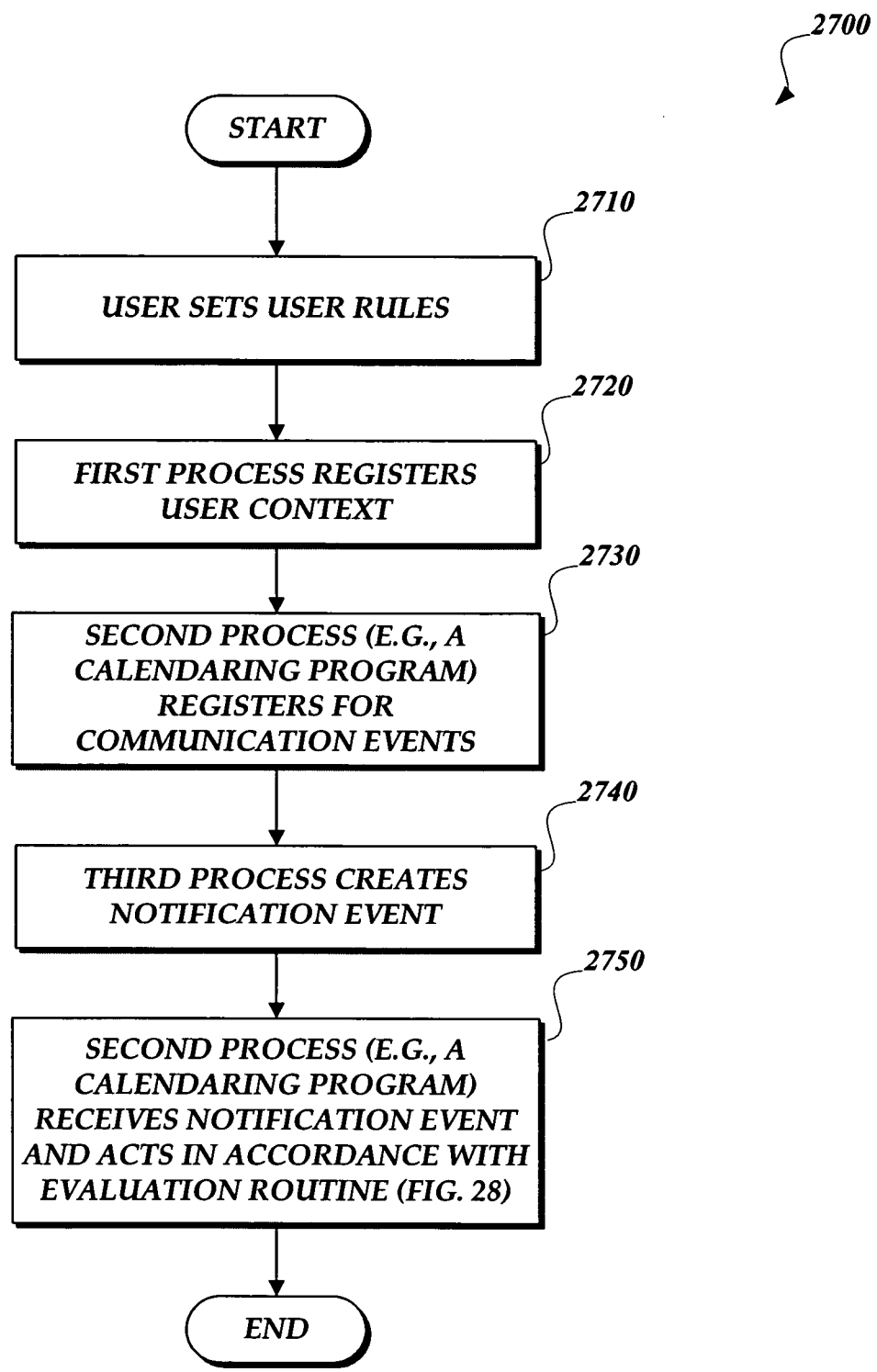
FIG. 27 is a flow diagram illustrative of a general routine for a process receiving a communication event and responding in accordance with an evaluation routine.

FIG. 27 is a flow diagram illustrative of a routine 2700 for a process receiving a notification event and acting in accordance with an evaluation routine. At a block 2710, the user rules are set by the user. At a block 2720, a first process registers a user context. For example, the first process may be a program that is running in full screen, which signifies to the notification system that the user is not available to interruption. In such a scenario, the user may be giving a presentation or may otherwise be fully occupied such that drawing on the screen would not currently be appropriate.

At a block 2730, a second process registers for receiving communication events. The second process in one embodiment may be a program that has some domain knowledge of the user's activities outside of the data that the notification system has. For example, the second process may be a calendaring program and may have knowledge of what activities the user is currently engaged in.

At a block 2740, a third process creates a notification event. For example, the third process may be any type of communication program, such as e-mail, instant messaging, telephone program, etc. The third process may utilize a notifications API for attempting to send the notification to the user, such that a notification event is created. At a block 2750, the second process (e.g., the calendaring program) receives the notification event and acts in accordance with an evaluation routine, as will be described in more detail below with reference to FIG. 28.

Figure 28:
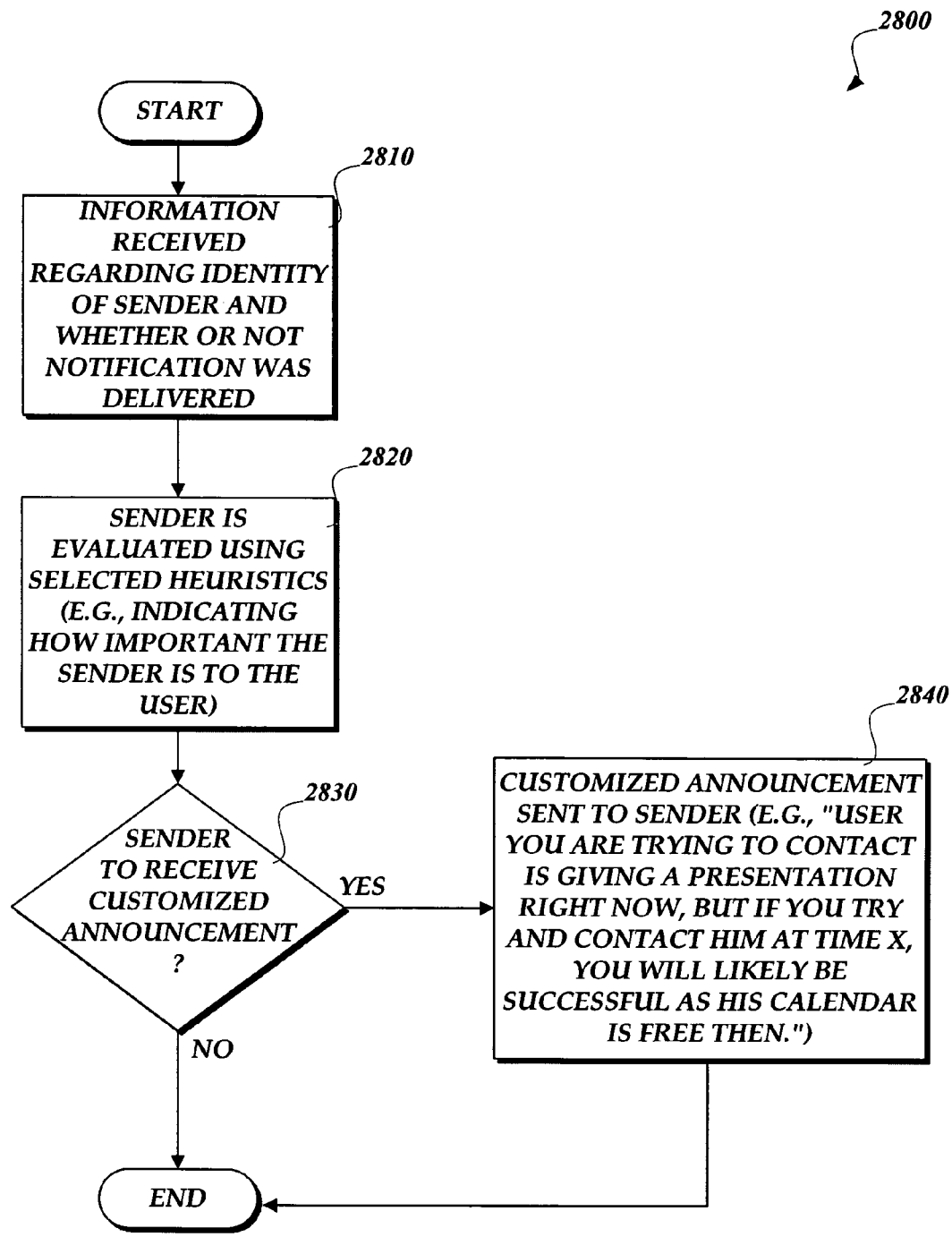
FIG. 28 is a flow diagram illustrative of a routine for a process to evaluate a communication event and send a customized announcement.

FIG. 28 is a flow diagram illustrative of a routine 2800 for a process (e.g., a calendaring program) receiving a notification event and acting in response thereto. At a block 2810, the process receives information regarding the identity of the sender of the notification and whether or not the notification was delivered. At a block 2820, the sender is evaluated using selected heuristics (e.g., which may indicate how important the sender is to the user). At a decision block 2830, a determination is made as to whether the sender satisfies the heuristic requirements (e.g., is important enough to the user) to receive a customized announcement. If the sender does not meet the requirements, then the routine ends. If the sender does meet the requirements, a customized announcement is sent (e.g., "the user you are trying to contact is giving a presentation right now, but if you try and contact him at time x, you will likely be successful as his calendar is free then").

It will be appreciated that the elements of the system may be configured to address certain privacy concerns. For example, the system described above may be configured so as to properly broker the permissions for sending customized automated busy replies such that personal information is not revealed inappropriately. In one embodiment, the system brokers the permissions for a process to register to receive such busy replies, such that the system may not know what the arbitrary process is going to do, but the system can broker what processes can be registered and can help guide the user to understanding the implications of allowing a process to be registered. In addition, there are various possible implementations for how this new type of agent process can act on the user's behalf. For example, the process may choose to send the communication back to the communication initiator itself, or it may choose to manipulate a public object model of the process by which the communication was sent. In addition, there are various possible implementations as to the list of individuals for whom such an agent should send a busy reply. One implementation would be to send it to all individuals who initiated communication during busy times, although this may not be optimal in some embodiments. In one embodiment, a system-brokered "important people" group may be created and only communications from these people will receive the customized busy reply. In this embodiment, the process that had registered for receiving communications events may in fact only be provided with the communication event if the sender is determined to be in the group of "important people." This would further allow the system to help broker appropriate responses on behalf of the user and to more appropriately act to help maintain the user's preferences and privacy. By having the group of "important people" be a public and system-brokered group, this helps the system in terms of overall transparency and dimensionism, which in turn makes the system more effective and easier to use.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for registering a process in a system where communication events occur that are related to notifications, the method comprising:
   providing a user context including a user context state, the user context defining a communication event to be performed in response to a notification for at least one value of the user context state;
   providing a rule that specifies at least one condition for modifying the defined communication event;
   receiving a message to register a process for communication events;
   registering the process in response to the received message, the registered process being a program that includes data regarding the user context state that is outside data maintained by other components of the system;
   receiving an indication that the user context state has changed value; and
   evaluating a sender, in response to the occurrence of the defined communication event or the modified defined communication event, to determine whether the registered process will send a customized message to the sender,
   wherein the evaluation of the sender comprises determining whether the sender has been placed on a list of persons entitled to receive the customized message.

2. The method of claim 1, wherein one type of communication event occurs when a notification from a sender is not delivered to a user due to a user's context.

3. The method of claim 2, wherein in response to receiving a communication event, the registered process provides a customized message to the sender of the notification that includes data about the user.

4. The method of claim 3, wherein the registered process is a calendaring program and the data about the user indicates a time when the user may next be available.

5. The method of claim 3, wherein the data about the user includes at least one alternative contact for the user.

6. A method for registering a process in a user context system, the user context system including a user context state and a rule, wherein a communication event to be performed in response to a notification is defined for at least one value of the user context state, and the rule includes at least one condition for modifying the defined communication event, the method comprising:
   sending a message for registering a process, the registered process being a program that has data regarding the user context state that is outside data maintained by other components of the user context system;
   evaluating a sender, in response the occurrence of the defined communication event or the modified defined communication event, to determine whether the registered process will send a customized message to the sender, wherein the evaluation of the sender comprises determining whether the sender has been placed on a list of persons entitled to receive the customized message, and
   providing the registered process with information regarding the communication event.

7. The method of claim 6, wherein the defined communication event is related to a notification that is sent from a sender to a user.

8. The method of claim 7, wherein the information regarding the defined communication event indicates that the notification did not reach the user.

9. The method of claim 8, wherein the information regarding the defined communication event includes a copy of the notification.

10. The method of claim 6, wherein the data provided to the registered process comprises data regarding the user's activities.

11. The method of claim 6, wherein the registered process provides a customized message to the sender of the notification that includes data regarding the user.

12. One or more computer-readable storage media having stored thereon computer-executable instructions including instructions for implementing a notification system comprising:
   a user context process for setting a user context including a user context state and at least one user rule, the user context and the at least one user rule being made available to a user for modification in accordance with a preference of the user, wherein a communication event to be performed in response to a notification is defined for at least one value of the user context state, and the at least one user rule includes at least one condition for modifying the communication event;
   a receiving component which receives notifications from a sending component and under specified conditions delivers the notifications to the user; and
   a registered process, the registered process being a program that has data regarding the user context state that is outside data maintained by other components of the notification system;
   wherein when the sending component sends a notification to the receiving component, if the notification is not delivered to the user then a message is sent to the registered process regarding the non-delivery of the notification and wherein a sender who is associated with the sending component is evaluated to determine whether the registered process will send a customized message to the sender, the evaluation of the sender comprising determination of whether the sender has been placed on a list of persons entitled to receive the customized message.

13. The media of claim 12, wherein the specified conditions under which a notification will not be delivered to a user are determined according to a user context.

14. The media of claim 12, wherein in response to receiving a message regarding the non-delivery of a notification the registered process provides a customized message to the sending component that includes data about the user.

15. The media of claim 14, wherein the registered process is a calendaring program and the data about the user indicates a time when the user may next be available.

16. The media of claim 14, wherein the data about the user indicates at least one alternative contact for the user.

17. One or more computer-readable storage media having stored thereon computer-executable instructions including instructions for implementing a user context system, comprising:
   a first process for setting a user context including a user context state and at least one user rule, the user context and the at least one user rule being made available to a user for modification in accordance with at least one preference of the user, wherein a communication event to be performed in response to a notification is defined for at least one value of the user context state , and the at least one rule includes at least one condition for modifying the communication event;
   a second process for generating a notification; and
   a third process that is registered;
   wherein the registered third process receives an event message in response to the notification not being delivered to the user, and wherein a sender of the notification who is associated with the second process is evaluated to determine whether the registered third process will send a customized message to the sender when the notification does not reach the user, the evaluation of the sender comprising a determination of whether the sender has been placed on a list of persons entitled to receive the customized message.

18. The media of claim 17, wherein the second process is a communication program.

19. The media of claim 18, wherein the communication program comprises one of an email or instant messaging program.

20. The media of claim 17, wherein the registered third process is a program that has data regarding the user that is outside data that is maintained by other components of the user context system.

21. The media of claim 20, wherein the registered third process is a calendaring program that has data regarding the user's scheduled activities.

22. The media of claim 20, wherein the registered third process provides a customized message to the sender of the notification which includes information regarding the user.

23. The media of claim 22, wherein the customized message indicates a time when the user may next be available.

24. The media of claim 17, wherein the user context that is set by the first process indicates when the user is not available to interruption.

25. The media of claim 24, wherein when the registered third process receives an event message indicating that a notification was not delivered to the user, the registered third process sends a customized message indicating when the user may next be available.

26. The media of claim 17, wherein the evaluation of the sender comprises a determination of whether or not the sender has been placed in a category that the user has selected.

27. One or more computer-storage media storing computer-useable instructions that, when executed by a computing device, perform a method for providing information regarding communication events, at least one communication event occurring when a notification is not delivered to a user, comprising:
   providing a user context including a user context state, the user context defining a communication event to be performed in response to a notification for at least one value of the user context state;
   providing a rule that specifies at least one condition for modifying the defined communication event;
   receiving a message to register a process for communication events;
   registering the process in response to the received message, the registered process being a program that includes data regarding the user context state that is outside data maintained by other components of the system;
   receiving an indication that the user context state has changed value; and
   evaluating a sender, in response to the occurrence of the defined communication event or the modified defined communication event, to determine whether the registered process will send a customized message to the sender,
   wherein the evaluation of the sender comprises determining whether the sender has been placed on a list of persons entitled to receive the customized message.

28. The computer storage media storing computer-useable instructions that, when executed by a computing device, perform a method according to claim 27, further comprising computer-usable instructions for enabling the evaluation of a notification in accordance with the user context in order to determine whether the notification will be delivered to the user.

29. The computer storage media storing computer-useable instructions that, when executed by a computing device, perform a method according to claim 28, wherein if the notification is not delivered to the user, then a communication event occurs which is delivered to the registered process.

30. The computer storage media storing computer-useable instructions that, when executed by a computing device, perform a method according to claim 27, wherein if a customized message is sent, the customized message is made to include data about the user.

31. The computer storage media storing computer-useable instructions that, when executed by a computing device, perform a method according to claim 30, wherein the data about the user indicates a time when the user may next be available.

* * * * *